US012029166B2

(12) United States Patent
Faulring et al.

(10) Patent No.: US 12,029,166 B2
(45) Date of Patent: Jul. 9, 2024

(54) HARVESTER WITH AUTOMATED TARGETING CAPABILITIES

(71) Applicant: Ceres Innovation, LLC, Salinas, CA (US)

(72) Inventors: Frank Faulring, Salinas, CA (US); Carlos Ramirez, Salinas, CA (US); Jason Faulring, Salinas, CA (US); Mark Keyser, Salinas, CA (US); Jacob Goellner, Salinas, CA (US)

(73) Assignee: Ceres Innovation, LLC, Salinas, CA (US)

( * ) Notice: Subject to any disclaimer, the term of this patent is extended or adjusted under 35 U.S.C. 154(b) by 254 days.

(21) Appl. No.: 17/425,615

(22) PCT Filed: Jan. 24, 2020

(86) PCT No.: PCT/US2020/015030
§ 371 (c)(1),
(2) Date: Jul. 23, 2021

(87) PCT Pub. No.: WO2020/154646
PCT Pub. Date: Jul. 30, 2020

(65) Prior Publication Data
US 2022/0078972 A1 Mar. 17, 2022

Related U.S. Application Data

(60) Provisional application No. 62/796,319, filed on Jan. 24, 2019.

(51) Int. Cl.
*A01D 46/30* (2006.01)
*A01D 45/00* (2018.01)
(Continued)

(52) U.S. Cl.
CPC ............. *A01D 46/30* (2013.01); *A01D 45/00* (2013.01); *A01D 46/253* (2013.01); *A01D 46/28* (2013.01); *B25J 9/02* (2013.01); *B25J 15/06* (2013.01)

(58) Field of Classification Search
CPC ...... A01D 46/30; A01D 45/00; A01D 46/253; A01D 46/28; A01D 75/28; B25J 9/02; B25J 15/06
(Continued)

(56) References Cited

U.S. PATENT DOCUMENTS

| 4,718,223 A | 1/1988 | Suzuki et al. |
| 6,193,291 B1 | 2/2001 | Morroney |

(Continued)

FOREIGN PATENT DOCUMENTS

| CN | 101273688 A | 10/2008 |
| CN | 108271532 A | 7/2018 |

(Continued)

OTHER PUBLICATIONS

U.S. Appl. No. 62/742,698, filed Oct. 8, 2018; Cedric Jeanty, et al.; Autonomous Crop Harvester.

*Primary Examiner* — Trang U Tran
(74) *Attorney, Agent, or Firm* — DLA Piper LLP (US)

(57) ABSTRACT

Systems and methods here may include a vehicle with automated subcomponents for harvesting delicate items such as berries. In some examples, the vehicle includes a targeting subcomponent and a harvesting subcomponent. In some examples, the targeting subcomponent utilizes multiple cameras to create three-dimensional maps of foliage and targets. In some examples, identifying targets may be done remotely from the harvesting machine, and target coordinates communicated to the harvesting machine for robotic harvesting.

19 Claims, 12 Drawing Sheets

(51) Int. Cl.
*A01D 46/253* (2006.01)
*A01D 46/28* (2006.01)
*B25J 9/02* (2006.01)
*B25J 15/06* (2006.01)

(58) Field of Classification Search
USPC .................................................. 348/120
See application file for complete search history.

(56) References Cited

U.S. PATENT DOCUMENTS

| | | | |
|---|---|---|---|
| 7,765,780 B2 | 8/2010 | Koselka et al. | |
| 7,810,305 B2 | 10/2010 | Macidull | |
| 7,854,108 B2 * | 12/2010 | Koselka | A01D 91/00 |
| | | | 701/50 |
| 8,306,663 B2 | 11/2012 | Wickham | |
| 9,120,233 B2 | 9/2015 | Moore | |
| 9,454,153 B2 | 9/2016 | Sights | |
| 9,475,189 B2 * | 10/2016 | Kahani | B25J 19/023 |
| 9,480,202 B2 | 11/2016 | Pitzer | |
| 9,554,512 B2 | 1/2017 | Davidson | |
| 9,877,428 B2 | 1/2018 | Moore | |
| 9,888,630 B2 | 2/2018 | Pitzer | |
| 9,888,631 B2 | 2/2018 | Pitzer | |
| 9,897,429 B2 | 2/2018 | Pitzer | |
| 9,913,428 B2 | 3/2018 | Pitzer | |
| 10,395,115 B2 | 8/2019 | Kumar | |
| 10,420,283 B2 | 9/2019 | Pitzer | |
| 10,464,217 B1 | 11/2019 | Phan | |
| 10,602,664 B1 | 3/2020 | Stubbs et al. | |
| 10,721,868 B2 | 7/2020 | Pitzer | |
| 10,779,472 B2 | 9/2020 | Robertson et al. | |
| 11,198,529 B2 | 12/2021 | Morrow | |
| 11,343,967 B1 * | 5/2022 | Freeman | B25J 15/0019 |
| 11,470,781 B2 * | 10/2022 | George | A01D 45/26 |
| 11,483,975 B2 | 11/2022 | Pitzer et al. | |
| 2003/0201652 A1 | 10/2003 | Hoyt | |
| 2006/0150602 A1 * | 7/2006 | Stimmann | A01D 46/30 |
| | | | 56/10.5 |
| 2009/0302626 A1 | 12/2009 | Dollar | |
| 2016/0069743 A1 | 3/2016 | McQuilkin et al. | |
| 2016/0157428 A1 | 6/2016 | Pitzer | |
| 2017/0095695 A1 | 4/2017 | Mangusson et al. | |
| 2017/0273241 A1 | 9/2017 | Salisbury et al. | |
| 2018/0035611 A1 | 2/2018 | D'Arrigo et al. | |
| 2020/0020093 A1 | 1/2020 | Frei et al. | |
| 2020/0323140 A1 | 10/2020 | Gielis | |
| 2021/0000013 A1 | 1/2021 | Robertson | |
| 2022/0087106 A1 | 3/2022 | Faulring et al. | |
| 2022/0183230 A1 | 6/2022 | Faulring et al. | |

FOREIGN PATENT DOCUMENTS

| | | |
|---|---|---|
| CN | 108401685 A | 8/2018 |
| JP | H09123080 A | 5/1997 |
| WO | WO2006013593 A1 | 2/2006 |
| WO | WO2010063075 A1 | 6/2010 |
| WO | 2016/133918 A1 | 8/2016 |
| WO | WO2017152224 A1 | 9/2017 |
| WO | WO2019133918 A1 | 7/2019 |
| WO | 2020/154473 A1 | 7/2020 |
| WO | 2020/154515 A1 | 7/2020 |
| WO | 2020/154646 A1 | 7/2020 |

* cited by examiner

HARVESTER WITH AUTOMATED TARGETING CAPABILITIES

CROSS REFERENCE

This application is a national phase of International Application No. PCT/US2020/015030 filed on Jan. 24, 2020 which relates to and claims priority U.S. Provisional Application No. 62/796,319 filed on Jan. 24, 2019, each of which is hereby incorporated by reference in its entirety.

TECHNICAL FIELD

This application relates to the field of automated agricultural harvesting equipment and methods using robotic assemblies, mobile harvesting units, remote harvesting, sensors for target identification, target tracking, and various combinations of related technologies.

BACKGROUND

The agriculture industry is highly reliant on human pickers to harvest a number of produce, including berries such as strawberries. The reason human pickers are still used today, despite the technological advancements available, is because of the difficulty of identifying a target such as a berry in a field, that is ready to be picked, reaching through the foliage of the plant to grasp that berry, and then carefully removing that berry without damaging it, to package and sell immediately.

Current automatic harvesting of such delicate and difficult to grasp agricultural targets such as berries, while operating in a harsh outdoor environment did not exist before this application.

SUMMARY

Systems and methods here may include a vehicle having various subcomponents for harvesting delicate agricultural items such as berries. In some examples, the subcomponents may be automated. In some examples, the vehicle may include a targeting subcomponent and a harvesting subcomponent. In some examples, the targeting subcomponent utilizes multiple cameras to create three-dimensional maps of the target and target areas sometimes including the agricultural foliage. In some examples, the targeting subcomponent may include any of various cameras, sensors, or other targeting features to locate and map targets in an automated or semi-automated manner. The system may then determine coordinates of the mapped targets to be passed to the harvesting subcomponent. In some examples, the harvesting subcomponent may include vacuum features which help a nozzle attach to an agriculture target for harvesting. In some examples, the harvesting subcomponent includes padded spoons to aid in removal of the targeted agriculture from the plant, including in some examples, a stem.

Systems and methods here include a harvesting vehicle system including a harvesting vehicle frame with computing device includes at least one processor and a memory including picking control systems, navigation systems, and communication systems, a picking subcomponent including a robotic arm and servo camera in communication with the computing device, additionally or alternatively, the robotic arm including a picker head assembly to harvest targets including a vacuum assembly with a compressor, hose, and padded spoons configured to remove the target from a target stem, additionally or alternatively, vehicle including multiple cameras in communication with the computing device, wherein the cameras are configured to capture and send image data to the computing device, additionally or alternatively, the computing device further configured to create three-dimensional maps of targets using the multiple camera image data, additionally or alternatively, the computing device further configured to direct the robotic arm and picker head to a target to harvest using the mapped coordinates, the picker head assembly configured to attach the vacuum assembly and padded spoons to the mapped target, and retract the target for harvesting. In some examples, additionally or alternatively, the computing device is configured to send the image data to a computer over a network and receive target selection from the image data. In some examples, additionally or alternatively, the received target selection regarding the image data from the network includes a selection of a category of each selected target. In some examples, additionally or alternatively, the categories of each selected target include grade, spoiled, immature, or ready to pick. In some examples, additionally or alternatively, the selected targets are selected by the computing system, using imbedded neuro network logic, trained from models of human selected targets classified as ready-to-pick, immature, or spoiled. In some examples, additionally or alternatively, the computer is further configured to utilize close in sensors to direct the picker head to a target once the picker head is within a predetermined distance from the target using the three-dimensional map. In some examples, additionally or alternatively, the communication system includes wireless communication devices, in communication with the computing device, configured to send and receive data regarding navigation and camera image data to wireless antenna in communication with a back-end computing system. In some examples, additionally or alternatively, the navigation systems include at least one of Global Positioning System, Inertial Measurement systems, Simultaneous Localization And Mapping systems, and an Odometer. In some examples, additionally or alternatively including a back-end computing system configured to cause display interface of the camera image data for a user, allow touch screen selection of targets and determination of coordinates for the selected targets to be sent to the harvesting vehicle computing device for picking by the picker head. In some examples, additionally or alternatively, the coordinates of the selected target are sent to a queue buffer at the harvesting vehicle computing device for picking by the picker head in queue order. In some examples, additionally or alternatively, the display of the camera image data includes preselected targets, preselected by the back-end computing system, based on training of models of targets, wherein the display interface allows users to affirm or change the preselected targets for harvesting.

Systems and methods of harvesting agriculture described herein include traversing a harvesting vehicle frame across a row of agricultural plants wherein the harvesting vehicle includes a computing device with a processor and a memory, wherein the computing device including target acquisition control, picking control, wherein the harvesting vehicle including a picking subcomponent with a robotic arm with a picker head assembly, wherein the robotic arm in communication with the computing device, the picker head assembly including a vacuum assembly with a compressor, hose, and padded spoons, capturing and sending image data to the target acquisition control of the computing device, using multiple cameras on the harvesting vehicle, identifying targets in the agricultural plants, by the target acquisition control of the computing device, using the image data, creating three-dimensional maps of targets, by the computing device using the image data, directing, by the picker control of the computing device, the robotic arm and picker head to a selected target using the three-dimensional maps of targets, and harvesting, by the picker control of the computing device, the target with the picker head assembly by attaching the vacuum assembly and padded spoons to the mapped target, and retracting the target. In some examples, alternatively or additionally, the traversing and navigation of the harvesting machine is controlled by navigation control in the computing device. In some examples, alternatively or additionally, sending and receiving target acquisition and navigation data from a communication control in the computing device with an off-board system. In some examples, alternatively or additionally, the communication control includes communicating using wireless communication devices by sending and receiving data regarding navigation and camera image data by wireless antenna in communication with a back-end computing system. In some examples, alternatively or additionally, harvesting with the picker head assembly includes sending commands to a picker head actuator to pinch padded spoons together to secure a target, the target being identified by the computing device target acquisition control. In some examples, alternatively or additionally, harvesting includes receiving data at the computing device target acquisition control, from close in sensors on the harvesting machine, directing the picker head to an identified target, by the computing device target acquisition control once the picker head is within a predetermined distance from the target, determined using the three-dimensional maps. In some examples, alternatively or additionally, the target acquisition data from the off-board system includes target selection with selection of a category of each selected target. In some examples, alternatively or additionally, the systems and methods may include causing display, with the off-board system, of a display interface of the camera image data for a user, and allowing touch screen selection of targets to be sent to the harvesting vehicle computing device for picking by the picker head.

BRIEF DESCRIPTION OF THE DRAWINGS

For a fuller understanding of the nature and objects of the disclosure, reference should be made to the following detailed description, taken in connection with the accompanying drawings, in which.

DETAILED DESCRIPTION

Figure 1A:
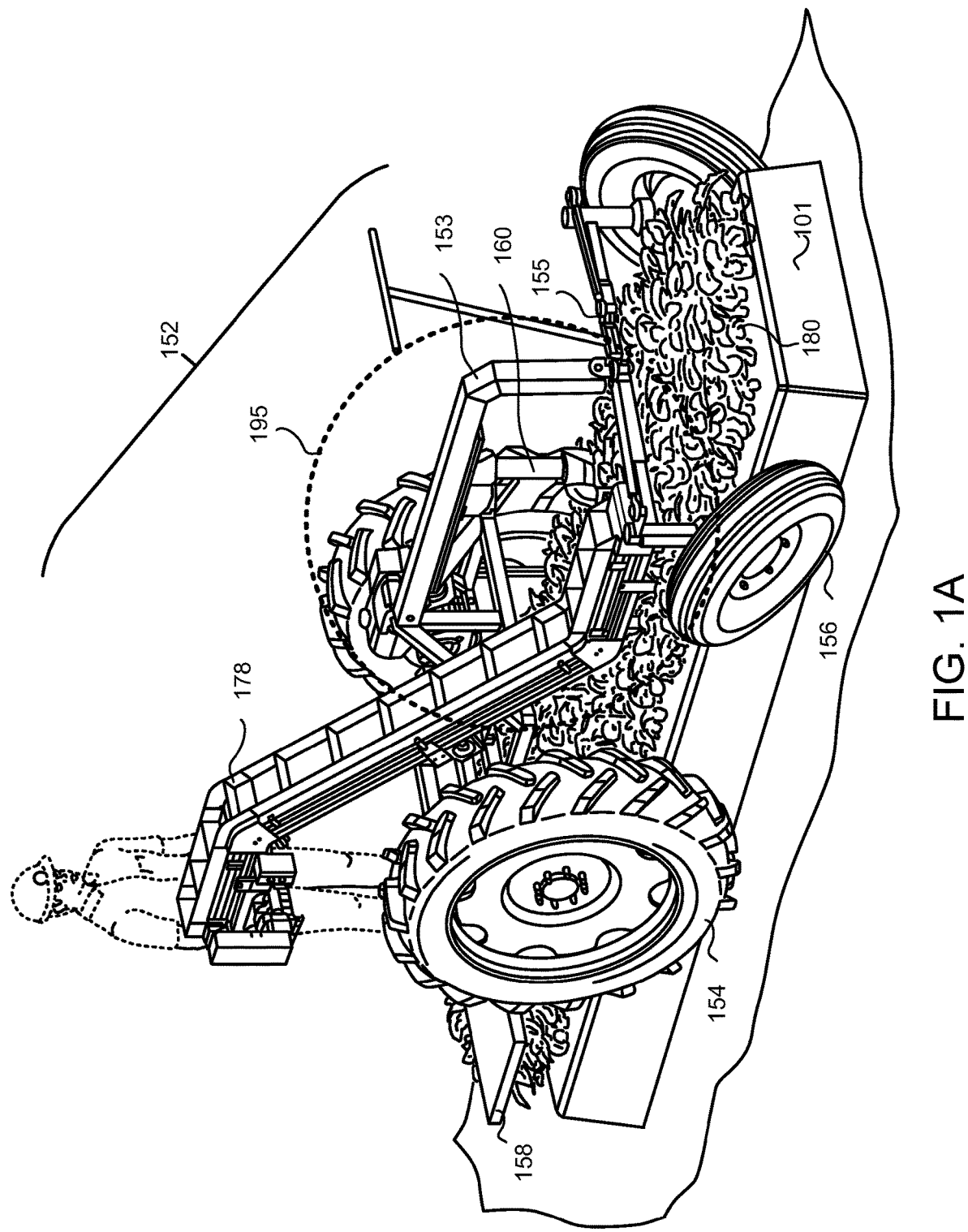
FIGS. 1A and 1B are diagrams showing example mobile vehicle examples as described in the embodiments disclosed herein.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Overview

The systems and methods described here include an automated and/or semi-automated system with machine(s) that is/are capable of harvesting agricultural targets such as berries from their planter beds without human hands touching the plants or targets themselves. This presents dramatic improvements in efficiency, productivity, more sanitary, and less strenuous agricultural harvesting than has ever been accomplished. These achievements may be made in the field, where agricultural plants are best suited and easily grown, yet harvested using machines, computer methods, remote target selection and/or combinations of these and other technologies.

Example overall systems may include subcomponents such as a seeker or sensor subsystem to find and locate the targets that works with and informs a robotic picking subsystem to harvest the targets. The overall system(s) may be mounted on wheels or tracks to advance down a row of targets such as agricultural produce planter bed rows so that the seeker subassembly may identify and map the targets while the picker subsystem is used to harvest, gather, pack and/or move the targets.

In some example embodiments, additionally or alternatively, the seeker subassembly includes a camera or multi-camera system such as a stereoscopic arrangement to capture image data to be sent to a wirelessly connected remote operator(s) to locate target berries and three-dimensionally map them. In such examples, these mapped target coordinates may then be queued for harvesting using the robotic assemblies. Additionally or alternatively, in some examples, the harvester subassembly is then able to follow the seeker subassembly and harvest the target berries whose mapped locations are queued by the seeker subassembly. In some example embodiments, the harvester subassembly includes at least one robotic arm with multiple degrees of freedom capable of reaching into the foliage of a plant and extracting a target such as a berry. In some examples, additionally or alternatively the extraction is aided by a vacuum system. In some examples, additionally or alternatively, the extractions are aided by a padded spoon grasper, capable of grasping, and in some examples, twisting and snapping a berry stem.

It should be noted that the examples used here describing berry harvesting, or even berry or strawberry harvesting in the written description and/or figures is not intended to be limiting and are merely used as examples. The agricultural targets to which the systems here may identify, map, and ultimately harvest may be any sort including but not limited to berries such as strawberries, blackberries, blueberries, and raspberries, other examples include grapes, figs, kiwi, dragon fruit, or other fruits. Vegetables may be harvested as well, such as Brussel sprouts, tomatoes, peppers, beans, peas, broccoli, cauliflower, or other vegetable. Any type of agricultural target may be harvested using the systems described herein. Additionally or alternatively, the systems and methods here may be used to target and gather non-agricultural items such as garbage, or be used to take scientific samples such as rocks or minerals in environments or situations where it may be advantageous to avoid human contact or interaction.

Harvester Subassembly

In some example embodiments, a harvesting subassembly is included as its own separate vehicle system from the seeker subassembly. Additionally or alternatively, in some examples, the harvesting subassembly may be in communication with or connected to the seeker subassembly. In some examples, seeker subcomponents are integrated into the harvesting assembly and one overall frame/chassis of a machine incorporates all of the features described herein. The harvesting subassembly may include any number of features that allow for autonomous, semi-autonomous, and/or manual human operable harvesting of delicate target agriculture such as berries, as described herein.

In such examples, computer components may be in communication with the various sensors and robotic arms and picker assemblies to locate, identify, and pick agricultural targets. In some examples, wireless communications may send and receive data from the harvester and sensors and picker arms to a remote computer which may include a graphical user interface (GUI) that displays the sensor data from the sensors, to allow a computer and/or human to identify targets to pick, thereby allowing the picker assemblies to utilize coordinate data from the sensors to pick targets. More detailed discussion of such features is found in FIGS. 6, 7, 5, 8, 9, 10, and 11 and accompanying descriptions below.

Regarding the overall picking machine, in some examples, either harvesting or seeker subassemblies may be mounted on its own vehicle subassembly with wheels and/or tracks or combination of both, to traverse down a row of agriculture with the seeker subassembly identifying and mapping the target berries and the harvester subassembly gathering targets.

Figure 1B:
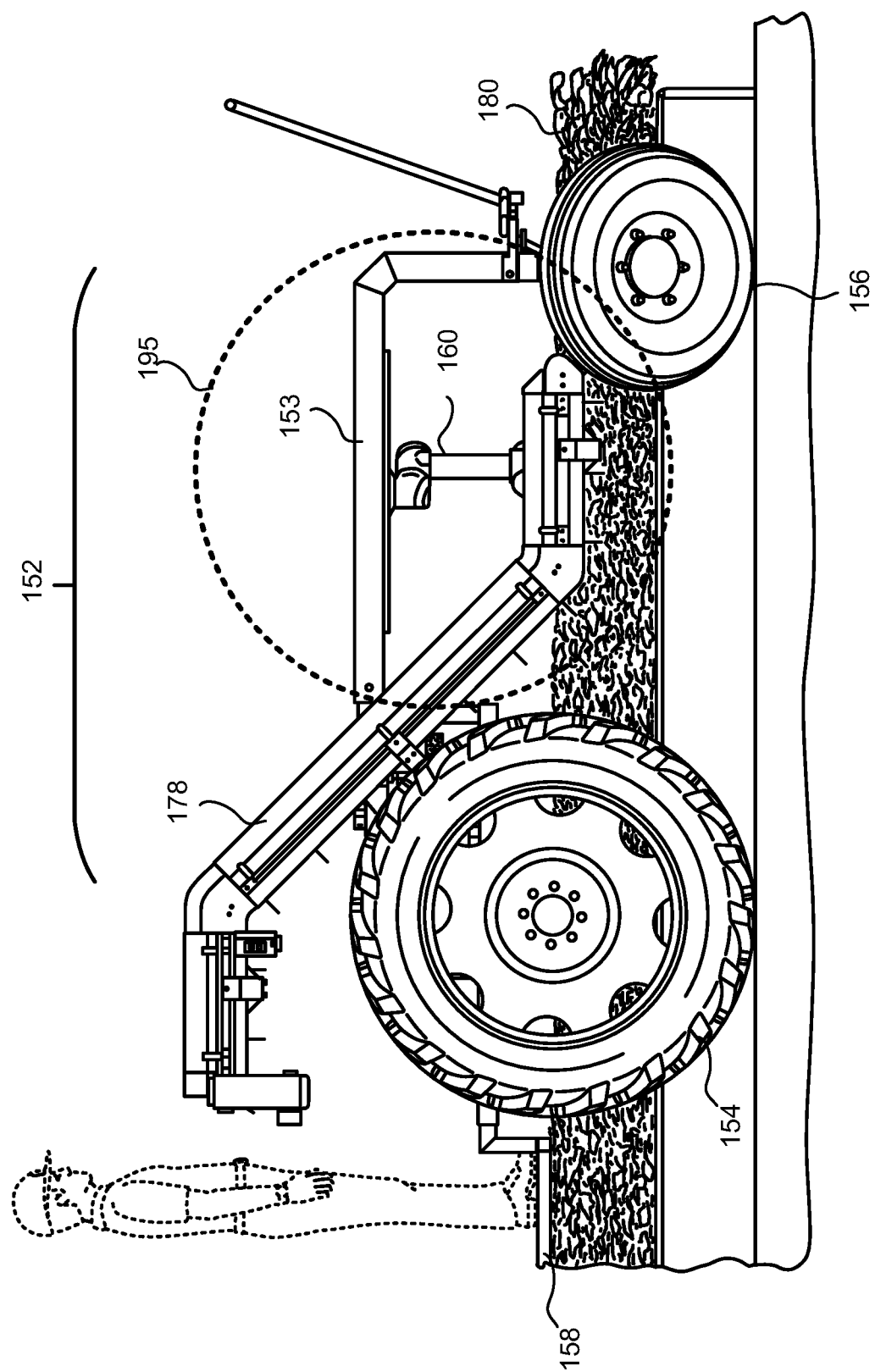

FIGS. 1A and 1B show different view of an example of the overall traversing machine to which any of the various subassemblies may be attached and/or coupled. In the example, the main traversing subassembly 152 includes various portions mounted to it including main driving wheels 154 and in some examples, guide wheels 156. In some examples, guide wheels 156 may be canted outward in order to support traversing a mound 101 should a mound be configured. In some examples, tank treads or tracks may be used instead of wheels 154, and/or a combination of wheels and tracks may be used.

In some examples, a robotic arm 160 or arms may be mounted to any of various frame portions 153 and/or chassis portions 155 that comprise the overall traversing subassembly 152. In some examples, the robotic arm 160 may include at least one picker head, at least one sensor, at least one light system, and/or a combination of picker heads, sensors, and/or lights to locate, identify, and harvest agricultural targets such as berries.

For example purposes, the range 195 of the robotic arm 160 is shown in the FIGS. 1A and 1B to show that the robotic arm 160 may reach different sides of the planter bed or row mound 101 where targets may be found and an accumulator for processing targets, such as the example traversing conveyor 178.

In some example embodiments, the harvesting subassembly may include at least one robotic arm 160 with joints that allow for multiple degrees of freedom. Such arms 160 may be configured to maneuver around and in foliage 180 of a target plant to extract the target agriculture such as but not limited to berries of any sort. In example embodiments, the robotic arm 160 may include various numbers of joints thereby allowing for various degrees of freedom to move around and about the plants and rows, taking different angles. In some examples, the robotic arm 160 may include six degrees of freedom. In some examples, the robotic arm 160 may include seven degrees of freedom, or any other number. In various example embodiments, the robotic arm 160 may be any of various lengths, thereby affecting the range 195 of the arm, which may be tailored to the needs of the particular field or mound or target. In some examples, the robotic arm 160 may include one or more telescoping portions, which may be elongated and/or retracted, thereby affecting the length of that portion and the overall reach 195 of the robotic arm 160.

It should be noted that many variations of robotic arms 160 may be used in the systems described here, including but not limited to robotic wrists with link and joint combinations with linear and rotational links, gantry robots with linear joints, cylindrical robots connected to rotary base joints, polar robots for twisting, and/or jointed-arm or articulating robots with twisting joints and rotary joints. Any combination of these or other robotic assemblies 160 may be used on the systems described herein to manipulate a picker head and/or sensors for harvesting agricultural targets as described.

It should be noted that the system in FIG. 1A, 1B is shown straddling one row of plants. In some examples, one system may straddle two, three, or wider mounds of plants and the example in FIG. 1A, 1B are merely intended to be an example, and not limiting. By making the system wider to straddle a second row, two sets of arms 160 may be used to pick two rows, or three, or four, or whichever number.

In some examples, multiple robotic arms 160 may be fit onto one overall traversing vehicle 152. For example, systems may include a primary picker assembly with a clean-up/redundant picker assembly which operates behind the primary setup. In those examples, up to eight picker arms 160 may be employed, four on the primary and four on the clean-up assembly, with one or two arms operating on each side of two rows. The clean-up system may operate in the same way that the primary system operates, to find targets that the primary system did not harvest, and/or to operate as a redundancy should one or more arms on the primary system malfunction.

In examples where targets are fruit plants which are harvested many multiple times during a single growing season, often multiple times per week, leaving fruit on a fruit plant may curtail the productivity of the plant. If the plant senses that it still has fruit on it, it may not produce more fruit. This would limit production, so the goal is to remove all of the fruit when ripe. As the bed rows may allow for some fruit to drape over the side of the plastic wrapped bed rows 101, and become easily exposed to viewing, other fruit may grow under the foliage 180, or on top of the bed row crowns and be obscured by foliage 180. Therefore, to find and harvest as much fruit from each plant as possible, it may be necessary to maneuver the foliage 180 to better view and/or harvest fruit targets as described herein.

In some examples, robotic arms 160 may include foliage moving features to alter, move, displace, and/or otherwise gently maneuver the foliage 180 of the plant to better expose the targets such as fruit berries to be picked. In such examples, a bar, or arm, may be pulled across the top of the foliage 180 in order to temporarily move it out of the way for the seeker cameras and/or the harvesting assembly to locate and grapple the target. In some examples, this foliage moving arm 160 may be maneuvered parallel or substantially parallel to the top of the row bed 101, and pull across the top of the foliage 180, bending the plant, but not breaking the plant leaves. This may reveal targets under the foliage 180, those laying on the top of the row bed 101, or those caught up in the foliage 180.

In some examples, a flexible curtain (not shown) may be dragged over the foliage 180, to avoid damage to the foliage, but still pull it out of the way for the seeker and/or harvester to operate. In some examples, this flexible curtain may be a plastic skirt, in some examples, it may be a fringed or sliced skirt. In some examples, it may have fringes that drape over the foliage 180, and yet flex around the foliage 180 so as not to damage it. As the flexible skirt is pulled over the plants 180, it may thereby help the seeker subassembly find the targets more easily by limiting the area to be targeted with a clean backdrop. The flexible skirt may be dragged from one side in one direction during a first harvest and the next time the other direction, to avoid biasing or pulling the foliage in the same direction each time.

In some examples, the overall traversing subassembly 152 may include a transfer conveyor 178. Such a conveyor may include any number of conveyor belts, chains, rope, or other mechanism that can pull materials from one place to another. Such transfer conveyor may be used to collect harvested targets from the robotic arm 160 which picks the targets from the plants 180 and moves them to a packaging subassembly, or storage unit.

In some example embodiments, the robotic arms 160 may be ruggedized in that the tolerances and durability of the arms are developed for outside, dirty employment. In such examples, the robotic arms are not to be operated in clean, pristine factory settings. The systems described here will operate in weather, precipitation, dirt, mud, heat, cold, and in jarring, rough conditions. As such, the bearings, tolerances, and actuators may be made of more durable materials than factory robotic assemblies. In some examples, extra gaskets may be fitted into the various robotic arm joints to keep dirt out of the more delicate metal couplings and pivoting features of the robotic arms 160. In such examples, gaskets may be made of rubber, plastic, and/or ceramic. The robotic arms 160 may be made with fewer joints to minimize the number of potential problems that may occur. The robotic arms 160 may be made of thicker materials, may be heavier, and be rust-proofed, waterproof, weatherized, and/or otherwise reinforced.

Picker Head Examples—Vacuum Point of Contact

In some example embodiments, the harvesting subassembly may include at least one picker head at the end of the robotic arm 160 that first interacts with the target in the field to remove or detach the target from the plant 180 it grows on. Such picker heads may be affixed to or be part of the robotic arms 160 as discussed in FIG. 1A, 1B. In some example embodiments, the at least one picker head may be mounted on or partially mounted on a robotic harvesting arm 160, alone or in combination with sensors such as cameras and/or lighting system(s).

Figure 2:
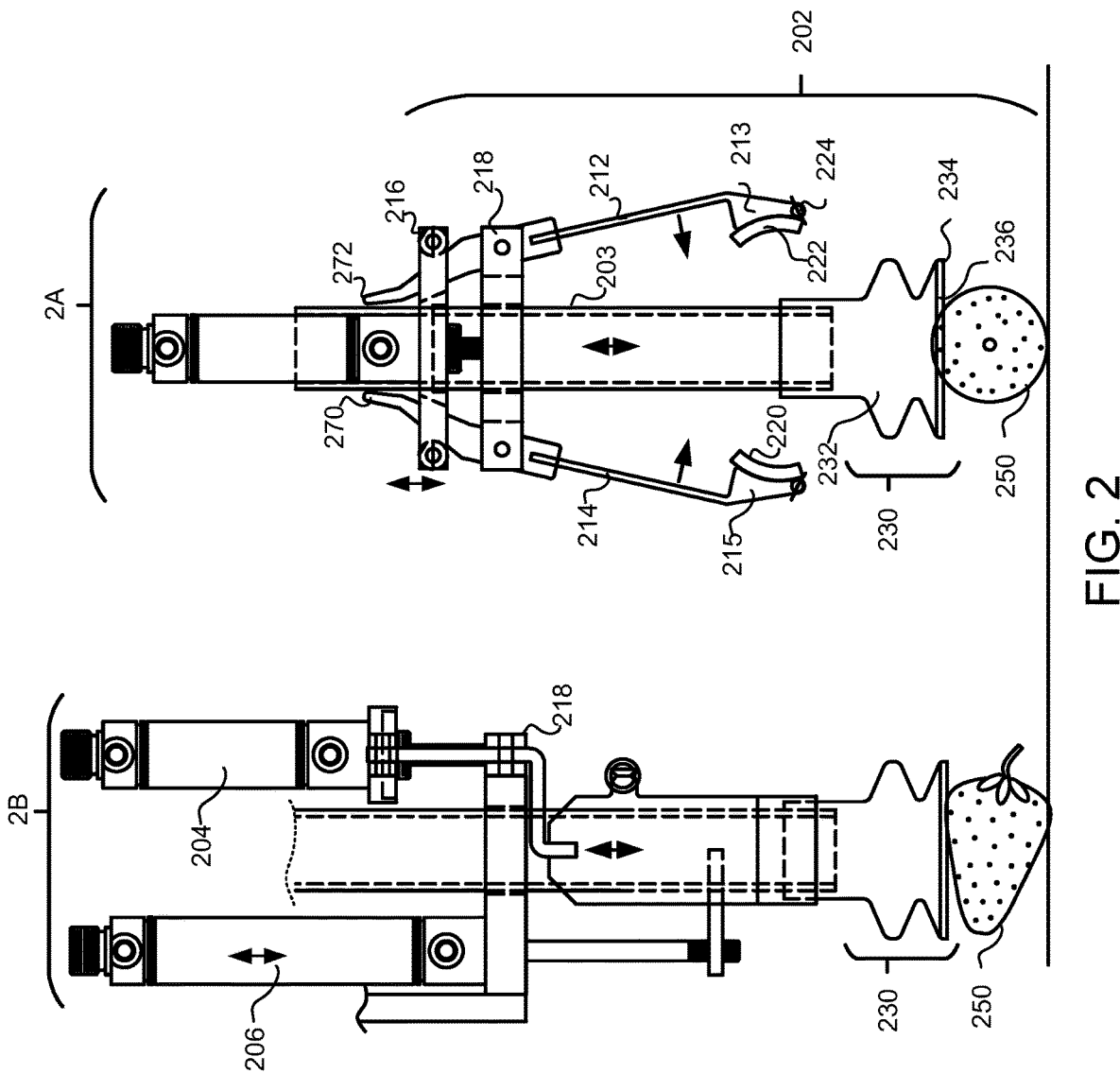
FIG. 2 is a diagram showing example picker head example details as described in the embodiments disclosed herein.

FIG. 2 shows an example picker head assembly which may be mounted to a robotic arm, with a front 2A and side 2B view of the same assembly in detail. The picker head assembly is designed to grasp and remove targets from the plants. Computer systems may be in communication with the component parts of the picker head assembly to operate it, as described herein. Many various features may be utilized alone or in combination to accomplish this task, and the example of FIG. 2 is one example, not intended to be limiting.

In the example shown in FIG. 2, the main picker head assembly 202 may be mounted with two actuators 204, 206, which are shown as pneumatic or fluid filled pistons that may extend or retract when actuated. In such examples, a computer system which may be in communication with the robotic assembly, sensors, lighting, etc. may also command the actuators to extend and/or retract, thereby actuating their respective component part.

In the example, one actuator may be utilized for the pinching, grappling spoons 204 and one actuator for an extender 206. In such examples, the actuator for the extender 206 may simply be attached to a bracket holding the nozzle 203, thereby extending or retracting the nozzle 203 with the actuator 206. In some examples, the actuator for the grappling spoons 204, may be in communication with a bracket 216 that when moved up or down, may contact the ends of the grappling spoons 270, 272, on one side of pivot or axis points on a fixed bracket 218, thereby opening and closing the spoon arms 212, 214 as the bracket 216 is slid up and down the ends of the spoon arms 270, 272 due to the tapered nature of the ends of the spoon arms 27, 272.

Figure 3:
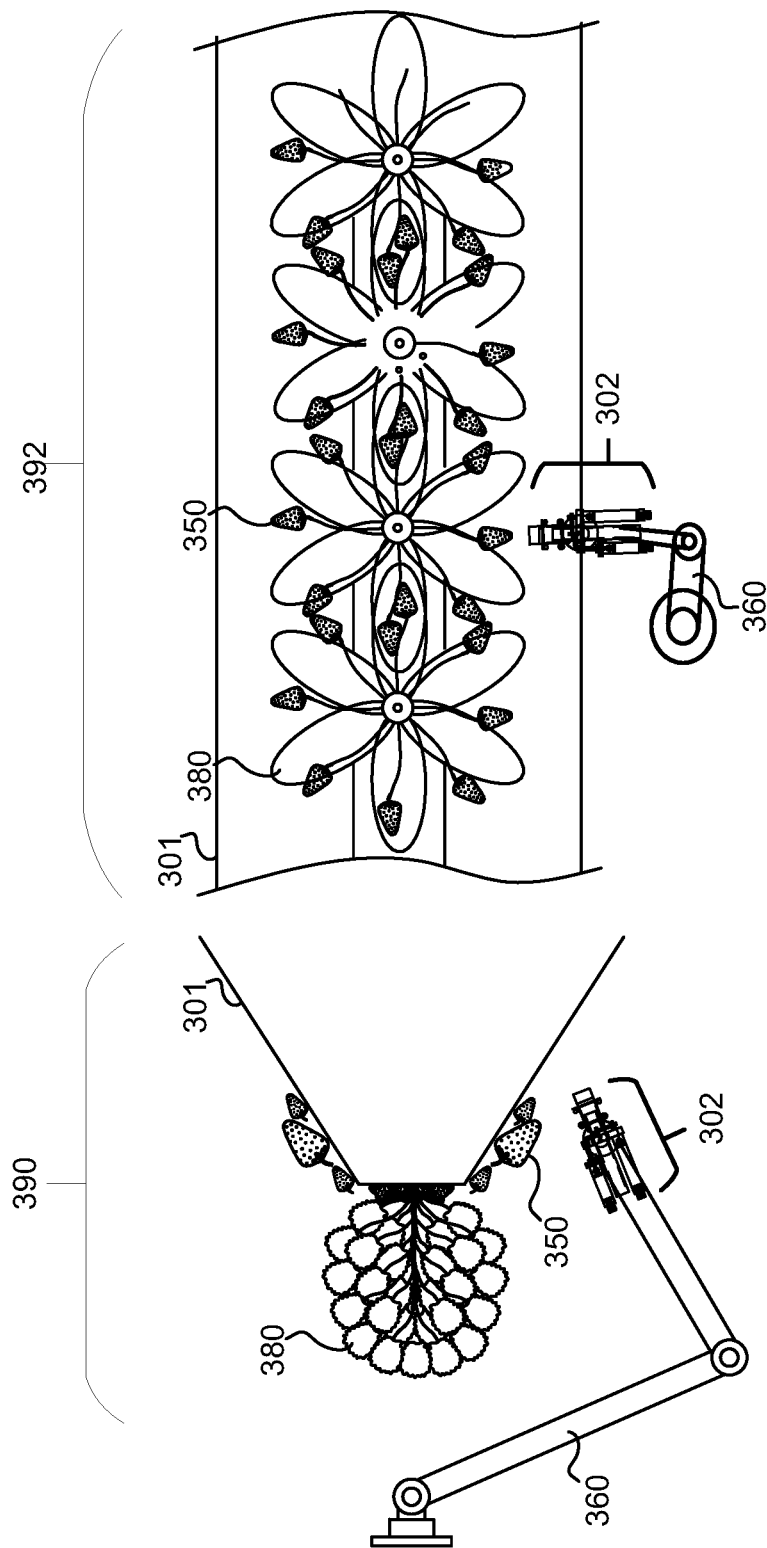
FIG. 3 are diagrams showing example conveyor belt examples as described in the embodiments disclosed herein.

In some examples, no extender actuator 206 may be utilized, and the vacuum tube 203 may remain stationary in relation to the spoons 212, 214. In examples where an extender 206 is utilized, the extender actuator 206 may move in and down to move the main nozzle 203 up and down, relative to the robotic arm (as shown in FIG. 3).

In some examples, the picker head assembly may utilize a vacuum feature to help grasp the target. In such examples, a main nozzle 203 may be a hollow tube in communication with a vacuum pump (not shown) which may lower air pressure in the tube 203 to be used to secure a coupling suction portion 230 to a target 250 such as a berry. In some examples, the coupling portion 230 may include one or more bellows or bellow configurations that allow the coupling portion to stay flexible and malleable to couple with the target 250. In some examples, the vacuum hose 203 may be connected with the main nozzle 230 to impart a suction or lower than ambient pressure within the nozzle tube 203, and thereby be able to attach to and secure a target 250. In some examples, a vacuum subsystem with a pump may be mounted on the harvesting subassembly and a vacuum hose may run through or around each harvesting picker robotic arm. In some examples, vacuum subassemblies may be mounted on the robotic arm itself, along with a vacuum hose on the picker head 202.

In some examples, the compression coupling portion 230 may be 1.250 inches in diameter, in some examples, the nozzle may be between 1.000 and 0.750 inches in diameter, but in any case, the nozzle could be customized to any size of intended target.

In some examples, the amount of suction power that the vacuum system imparts, may be 35 inches of vacuum. In some examples, 50 inches of water-column vacuum may be used. Alternatively or additionally, in some examples, less than 80 inches water-column of vacuum may be used so as to avoid damage to the target 250. In some examples, less than 65 inches water-column of vacuum may be used to avoid damaging targets 250. Alternatively or additionally, in some examples, the amount of suction power may be between 35-50 inches water-column of vacuum may be used. Additionally or alternatively, the vacuum system may be able to reverse from suction to blowing air outward, to clear debris, before switching back to a suction mode for harvesting.

The compression nozzle portion 230 may include a malleable hood or coupling section 232 which may include one or more bellow sections, and a rim 234 around an opening 236 to aid in coupling to a target. In some examples, the compression coupling portion 230 is or made up of at least one of, or combination of a neoprene sleeve, a silicone sleeve, a rubber sleeve, or other natural or synthetic material that is soft and flexible. Such a malleable coupling section 232 may be configured to deform or otherwise compress when a target 250 is contacted and may include baffles or other structure that allows for deformation and malleability. Such a deformation or compression may allow for the rim 234 to more easily conform to the target 250 and thereby form a better suction fit for the opening 236 on the target 250.

In some examples, the compression nozzle portion 230 may include an internal reverse conical mesh at the end 236 to help capture the target 250 yet be as gentle as possible on them. In such examples, the mesh may create an environment where the vacuum is acting on a broader surface of the target, thus minimizing the chance of target damage from localized contact to the grappler edges. This mesh 236 may thereby form a cradle for the target to lay in even while being picked and moved. Such a mesh 236 can be made of silicone materials for durability and flexibility. Alternate materials may be used such as a wire mesh, a plastic mesh, or a combination of wire mesh with plastic coating. Silicon coating may be used on a wire mesh in some example embodiments as well.

In some examples, the compression nozzle portion 230 and the opening rim 234 may be sized for a most average target 250, big enough for the biggest targets and flexible, but able to grasp and vacuum even a smaller target.

Examples may also include an internal spring system, inside or integrated into the coupling portion 230. Such a spring system may be made of plastic or metal coil(s) that help return the coupling portion 230 back to an extended shape after a target is released by turning off the vacuum and thereby deposited the target 250. Additionally or alternately, a mechanical iris or camera lens type feature may be integrated into the nozzle 230 and in communication with the computer systems. In such examples, the system may be able to adjust the size of the opening or nozzle 203 end for different sized targets 250, opening for larger targets, and constricting for smaller targets to control the size of the opening and thereby the amount of air being vacuumed. In such examples, a coil or spring could be wound tighter for smaller targets and wound looser for larger targets.

Another portion of the example embodiment of FIG. 2 is the grappler spoons 212, 214. The grappler spoons 212, 214 may be configured with the main nozzle 203 between them and be configured to move in a pincer motion toward the nozzle 203 by a robotic actuator 216 and a hinge 218 arrangement. In some examples, the hinges in the hinge, pivot bracket 218 may be spring-loaded in order to impart a force on the spoons 212, 214 to bias them together, and thereby work against the force of the pincher bracket 216 when it is extended or retracted by the pincher actuator 204. In some example embodiments, the grappler spoons include a cushion 220, 222. In some examples, the cushion 220, 222 may be made of or include closed cell foam, neoprene, gel filled pads, liquid filled pads, open cell foam, layers of foam of different densities, a foam backing with a gel filled pad on top, and/or any combination of the above or other material that may cushion a target 250 when the grappler spoons 212, 214 pinch the target 250. In some examples, the material contacting the target 250 is no more than 20-30 durometer in hardness.

In some examples, a pneumatic trash cleaning air jet 224 may be mounted to the end of the grappler spoon 212, 214 in order to help clear debris. In such examples, air holes may be configured on the end lip of the spoons and face in various directions to direct air toward foliage. In some examples, a line of holes may be configured on the end lip of each grappler spoon 212, 214.

In some examples, a picker head 202 may include two grappler spoons 212, 214. In some examples, three spoons may be employed in a similar manner as those examples shown with two as in FIG. 2. In some examples, four grappler spoons may be configured in two axes around the picker head 202 assembly. In some examples, alternatively or additionally, the grappler spoons include a hinged and/or spring loaded portion at the end to better cushion the target 250 when pinched. In some examples, the grappler spoons 212, 214 may pivot about the nozzle 203 to impart a twisting motion to snap a berry or other stem as discussed herein.

Robotic Arms with Picker Heads Examples

FIG. 3 shows two views, a side on 390 and top down 392 view of the same robotic arm 360 and picker head assembly 302 picking targets 350 from a plant 380 on a planter bed 301. As discussed above, the picker head assembly 302 may include any number of vacuum grappling and/or pincher spoon features that may allow the picker head assembly 302 to grasp and pick a target 350. Any of various sensors may be employed as described herein to locate and identify the targets 350, to create coordinates of the targets 350 to pass to the picker sub assembly 302 by computer, to pick.

Seeker/Sensor Subassemblies

In some examples, the harvesting described herein is directed by a seeker subassembly that is able to identify targets for harvesting, pass coordinates for the targets to the picker subassembly for extraction. Such seeker subassemblies may include any number of cameras (visible light, thermal, UV or other), radars, lidars, lasers, acoustic location finders, GPS, inertial navigation systems, piezoelectric sensors, and/or any combination of these or other sensors to locate and identify targets. The sensors may be in communication with a computing system, such as that described in FIG. 11 to send and receive data, commands, and/or any information to operate and share information regarding their respective sensor information gathered, including but not limited to pixelated image data.

Figure 4:
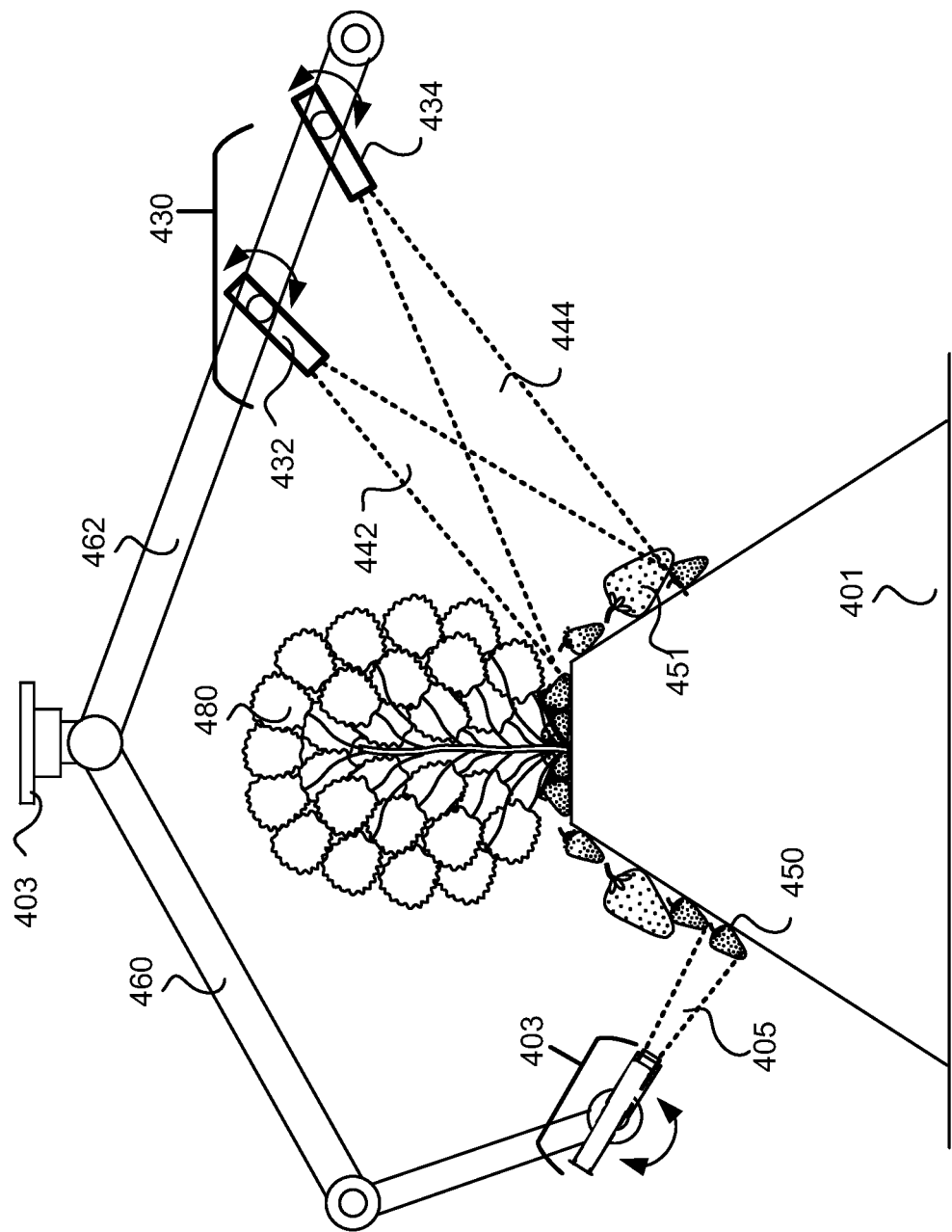
FIG. 4 are diagrams showing example sensor examples as described in the embodiments disclosed herein.

In some examples, a suite of these or other sensors could be placed at the end of a robotic arm such as those shown in FIG. 4. In the example, a sensor 403 may be mounted to an articulating robotic arm 460 and is able to be maneuvered by a human operator and/or computer, to locate and detect a target 450 in whichever manner the senor operates (light, heat, lidar, acoustic, radar, etc.). In such a way, the multiple degrees of freedom of the robotic arm 460 may be used to maneuver the sensor 403 into line of sight 405 with a target 450. In some examples, multiple sensors 403 may be configured on a single arm 460. In some examples, multiple arms 460 may operate with their own or multiple sensors 403. In some examples, sensors 403 may be mounted on a rotatable mount and/or robotic arm 460, able to move and/or rotate in one, two, three, four, five, six, seven, or more degrees of freedom. In some examples, a robotic arm 460 includes sensors, picker heads, and/or multiple sensors and/or picker heads, and/or a combination of sensors and/or picker heads as described herein.

Figure 5:
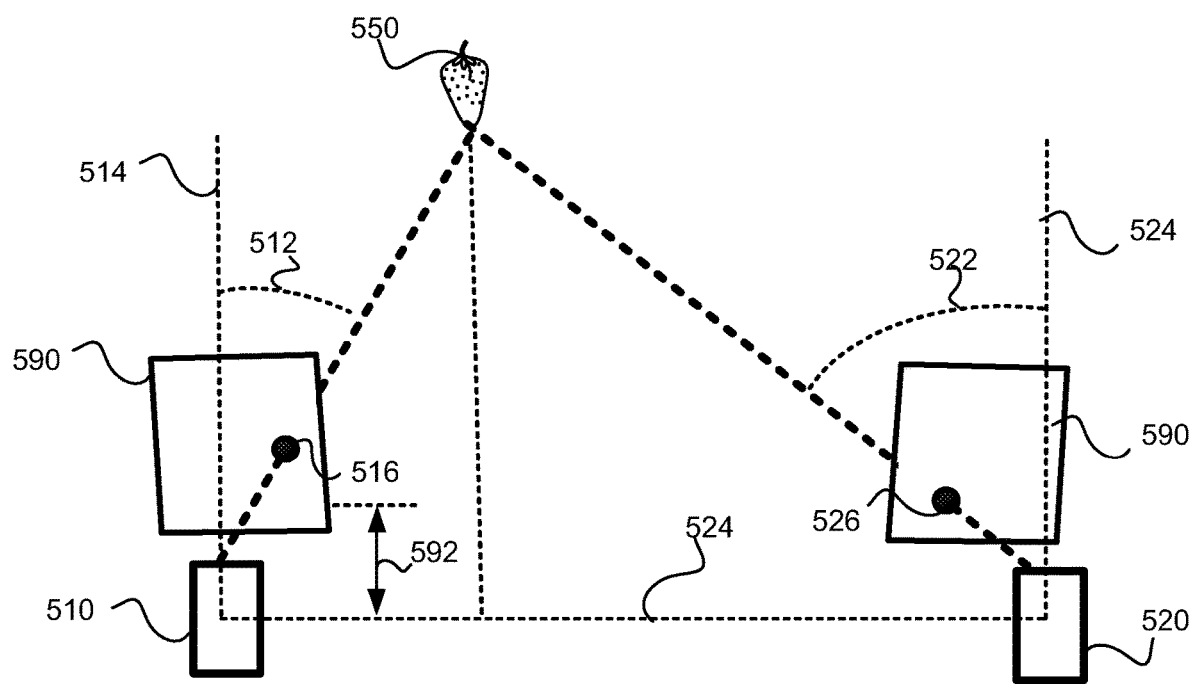
FIG. 5 is an example stereoscopic camera arrangement that may be used in the embodiments disclosed herein.

In some examples, a frame portion (partially shown as 462) of the harvester and/or seeker subassembly may include mounted camera(s) 430 configured to locate and detect targets 451. In some examples, one or multiple cameras 432, 434 may be configured such that they have a line of sight 442, 444 to the planter bed 401 and/or foliage 480 to locate and detect targets 451. In some examples, the sensors 432, 434 may include rotatable mounts to swivel and/or rotate to view targets 451. In some examples, as shown in FIG. 5, multiple sensors 432, 434, may be used in a stereoscopic arrangement to view the same field of view 442, 444 from different angles, and thereby be used to create coordinates of the targets 451 by the computing system as described herein.

Camera Examples

In some example embodiments, the sensors described herein may include a camera and/or multiple cameras (for example, but not limited to, 403, 432, 434, etc.) arranged so as to be able to view the target foliage and thereby the target agriculture to be harvested. In some examples, multiple cameras may be arranged on the seeker subassembly such that digital, pixelated images taken from the multiple stereo cameras may be processed by a computing system to create three-dimensional (3-D) images using machine vision. In some examples, these images are made of pixels and the computing systems is able to identify targets represented by pixels to be harvested and map the targets in three dimensions.

Examples of cameras which may be used in the described systems include stereo vision with resolution of 1920×1080 and frame rates of 30 per second. In some examples, the cameras may include stereo vision with a resolution generally in the range of 1900×1000 and frame rates in the range of 10-60 per second. Other kinds of digital cameras may be used as well, as these examples are not intended to be limiting.

In some examples, the cameras may be configured to acquire multi-spectral or hyper-spectral imagery to enable the use of advanced analysis algorithms for evaluating fruit health, quality and/or ripeness based on the pixelated data. In some examples, the images gathered may include those of a thermal imaging system for evaluating the temperature of the berry to be harvested. These cameras may comprise of cooled or uncooled sensors generating area-scanned, point scanned, and/or line scanned images of at least 160×120 pixels. Some embodiments may utilize a single thermopile-based sensor to provide an integrated temperature measurement of the mean temperature of the target berry to be used in analyzing ripeness and/or target berry health.

In some examples, the target identification may be automated by the camera systems. In some examples, the target identification may be aided by a human who is analyzing a visual representation of the image data sent by the camera(s) wirelessly at a viewer/operator station as described in FIG. 7, FIG. 9, etc.

Mapping and Passing Target Coordinates

Figure 6:
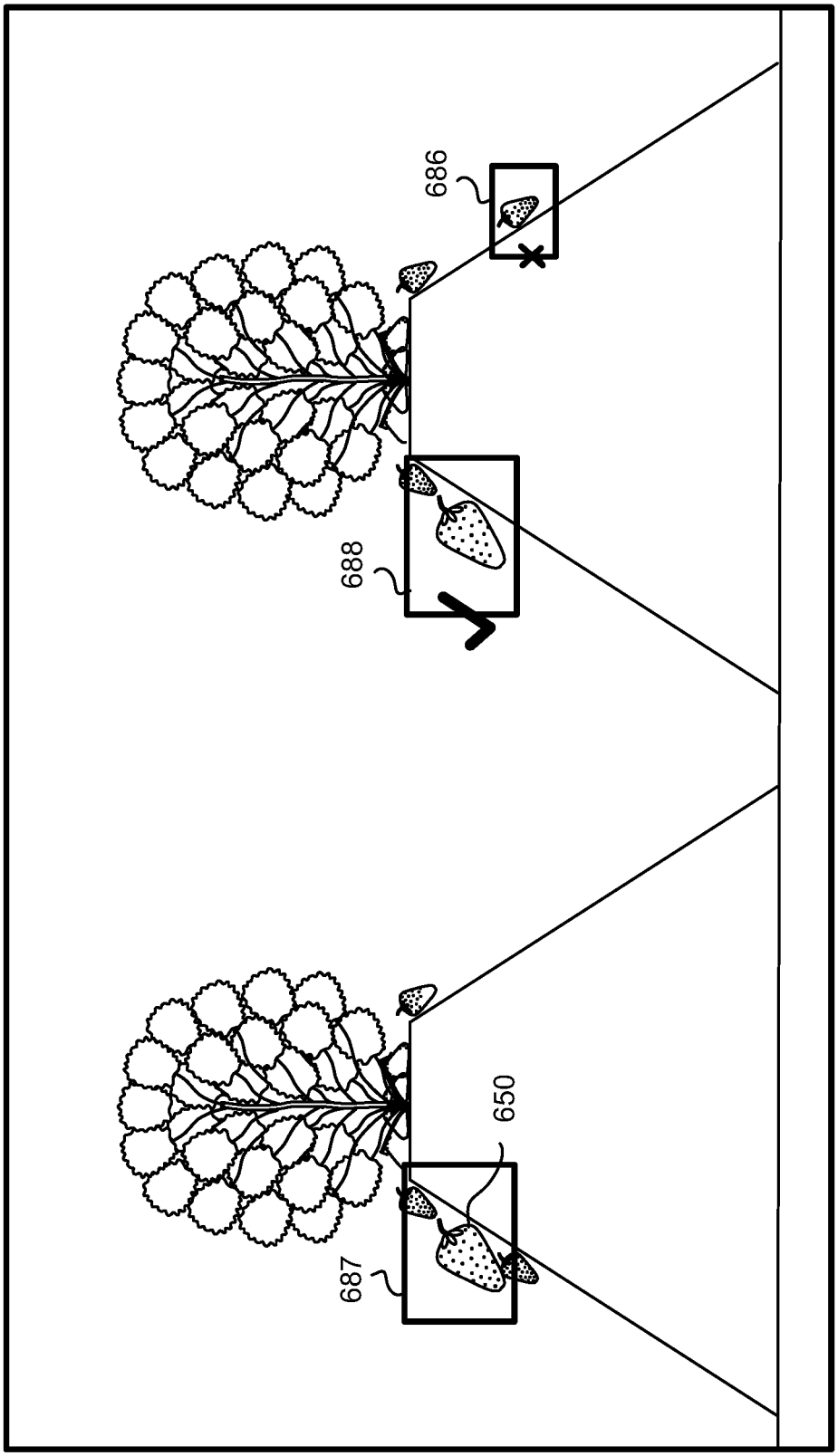
FIG. 6 is an example GUI may be used in the embodiments disclosed herein.
Figure 7:
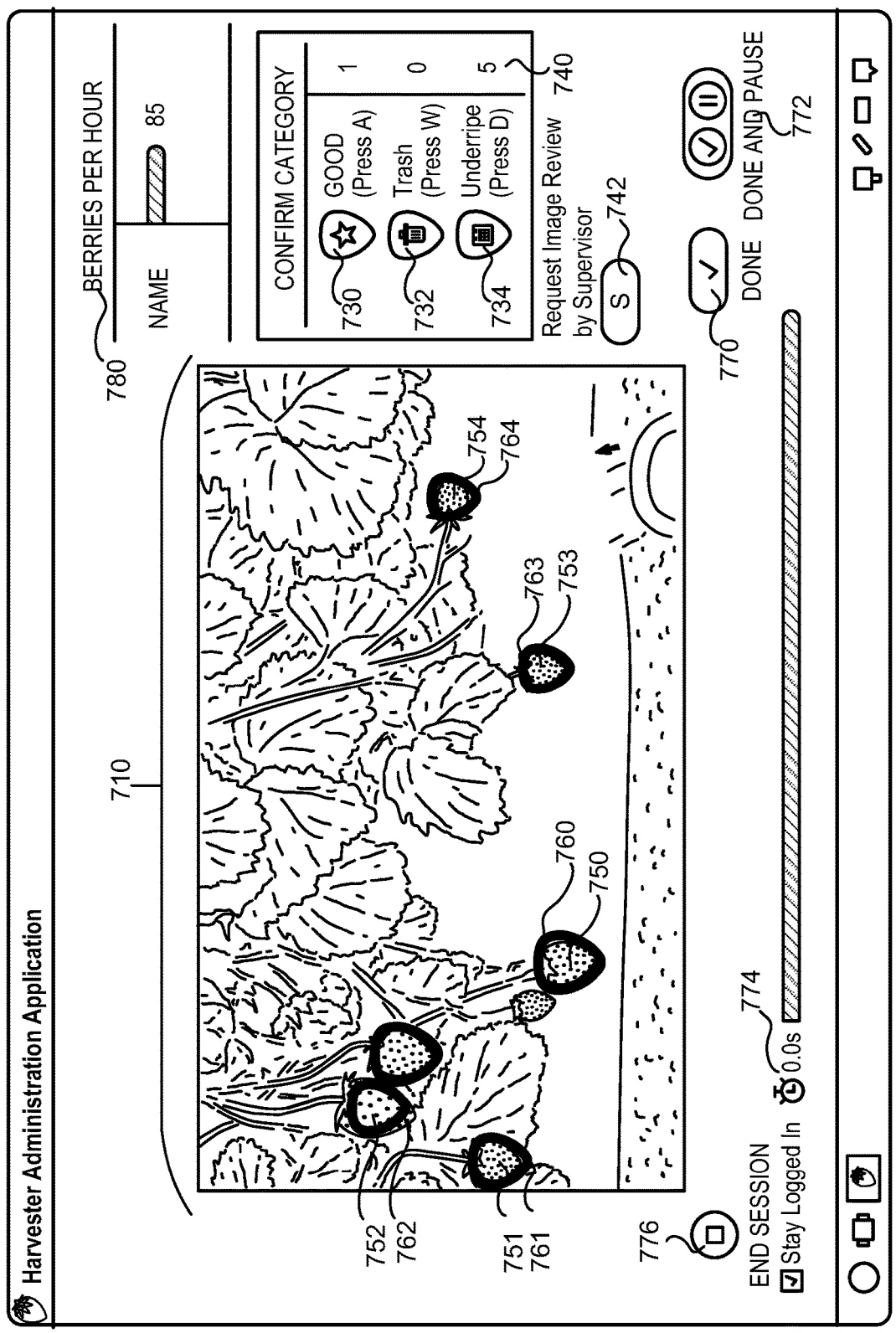
FIG. 7 is another example GUI may be used in the embodiments disclosed herein.

In some example embodiments, additionally or alternatively, as described herein, sensors onboard the harvesting systems such as machine vision camera and computing systems may be used to map targets in three dimensions and pass the coordinates to the harvester subassembly for harvesting. In the remote GUI examples, as shown in FIG. 6 and FIG. 7, the user or computer may select targets from images for the computer to map. These mapping coordinates may be described in a global coordinate system such as Universal Transverse Mercader (UTM), or a local coordinate system frame relative to the coordinate system defined by the three-dimensional imaging system on the harvester. In some examples, a three-dimensional X,Y,Z coordinate system may be employed using an anchor point in the camera view and/or on the traversing machine itself. In some embodiments the machine vision cameras may be calibrated extrinsically and intrinsically determine their location relative to other elements in the harvester and characterize the focal length, offsets, and lens distortions of the camera. In some embodiments, the intrinsic and extrinsic calibration parameters may be generated automatically by the system using on-harvester reference points; additionally or alternatively separate calibration targets with known geometries may be used.

The various sensors described herein including but not limited to visible light cameras, infrared cameras, ultraviolet cameras, lidars, radars, lasers, or other sensors may be used to scan the produce plants and identify targets. Using the automated, semi-automated, or manual selection processes and systems described herein, the systems could generate coordinates for selected targets, including by the computer and/or human selection as in a GUI on FIG. 6 and/or FIG. 7. These mapped target coordinates may then be queued in a buffer or database, for the harvester subassembly to harvest in queued order, using the grappler systems described herein. In some examples, after one target coordinate may be added to the harvesting coordinate queue, more targets may be added to the queue to be harvested in turn. In such examples, the targeting subassembly, machine vision, and target mapping may occur without lag or delay in the handoff from targeting to harvesting, and not be hampered by the limitations of the harvesting subassembly itself.

In such a way, in some examples additionally or alternatively, the targeting subassembly may be mounted on a separate vehicle to travel at its own speed and send targeting mapped data to the harvesting subassembly by wireless communications. In some examples, the targeting subassembly may be a part of the overall harvesting machine and/or connected to or in communication with the harvesting subassembly to pass the targeting mapped coordinate queue by wired communications to the harvesting subassembly. In some examples, a cloud or distributed computing resource may be utilized so that the targeting queue may be relayed or sent to the harvesting subassembly wirelessly as described in FIGS. 8, 9 and/or 10.

In some examples, the mapping may be done early or before a harvester machine may come down a row. Additionally or alternatively, in some examples, mapping may be done just before harvesting, on the same machine in some examples to minimize the variables of the berries and/or foliage moving. Any time between target mapping and harvesting may be utilized, depending on the circumstances of the harvest.

Figure 8:
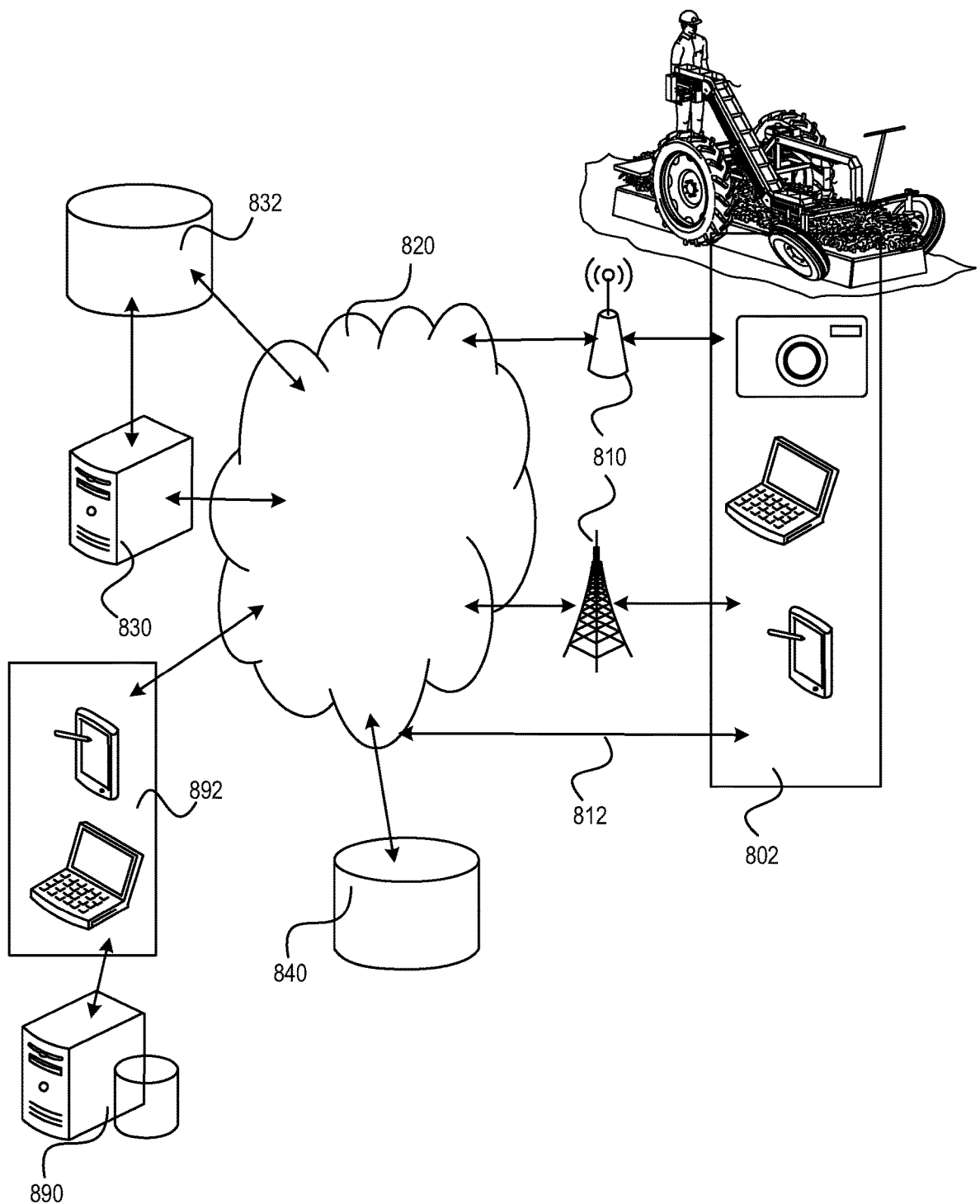
FIG. 8 is an illustration of an example networked system in accordance with certain aspects described herein.
Figure 9:
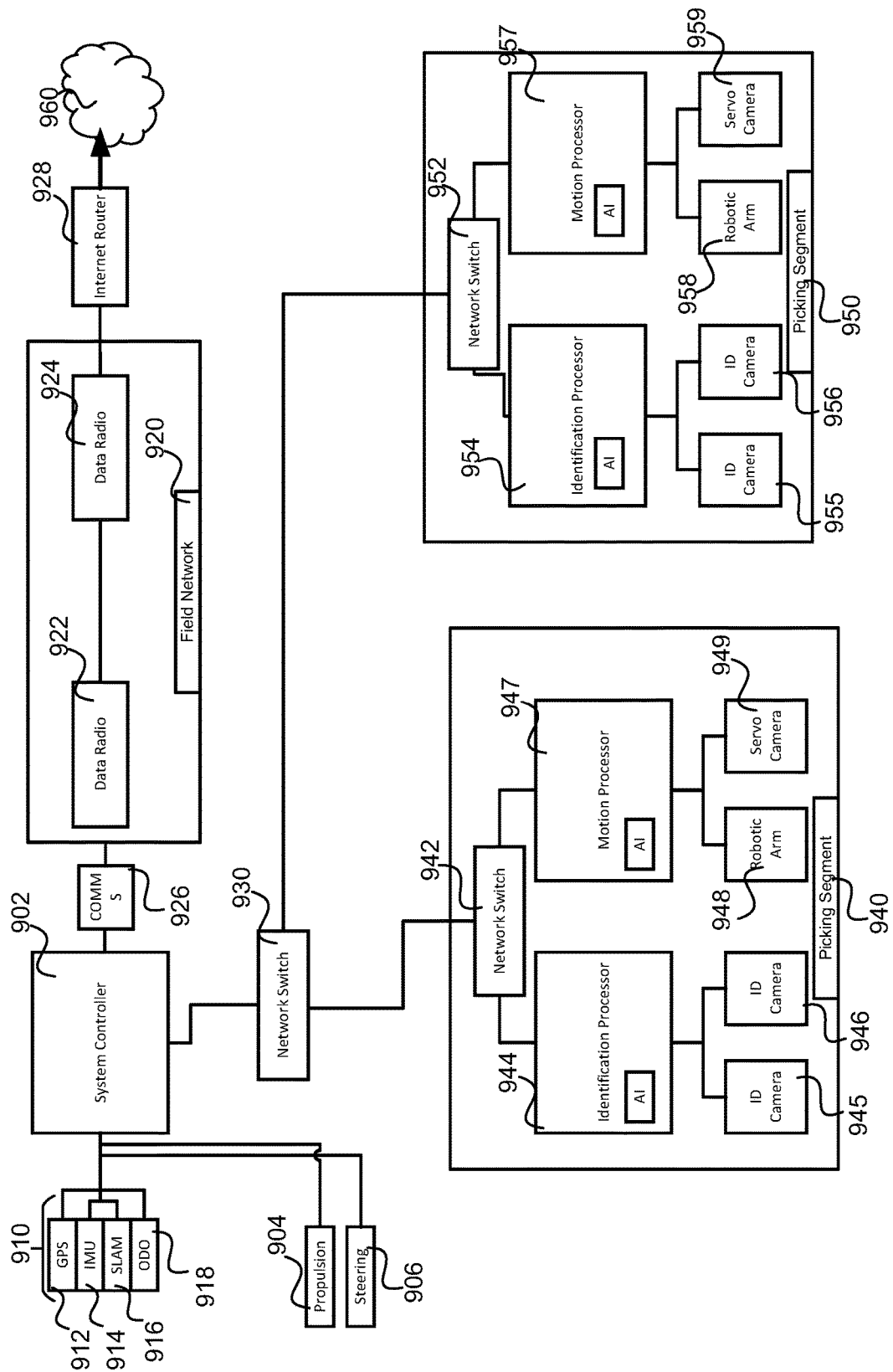
FIG. 9 is an example computer architecture arrangement that may be used in the embodiments disclosed herein.

In some examples, mapping information may be stored in a remote server, cloud server, or distributed system, for the purpose of future analysis (post processing) of the imagery to evaluate the condition of the plant as described in FIGS. 8, 9 and/or 10. Post processing operations may include an evaluation of the plant for disease, nutrient deficiency, unripe berry inventory, and/or other plant damage. In some embodiments, the resolution of the imagery may be fine enough to resolve and detect defects, disease, and/or pests on a per-target scale. Data gathering and analysis on all types of agricultural specifics may be accomplished using the suite of cameras and/or sensors on the systems described herein. For example, outputs of post processing operations may be utilized to selectively address in-field issues at a plant-local scale that may otherwise require broad remedies using traditional methods. Other outputs of post processing operations may generate statistical data related to observations and measurements that are made while the harvester is operating in the field that can be advantageous to the growers business efforts.

Some examples may include close in targeting systems and/or systems that are capable of passing target coordinates not only from a target acquisition system to a picker head for ultimate harvesting, but in some examples, to pass coordinates from one set of sensors to another set of sensors to thereby better acquire a target more precisely, using more granular coordinates as described above.

Some examples may include stand-off cameras that are capable of handing off control to close in cameras at a specific threshold of distance, or at a specific trigger. In such examples, the computer may lock onto target visually using a wide lens/wide field of view camera, generate coordinates for the identified target, and then hand off the coordinates of that target to a narrower lens/narrower field of view camera which may allow for more granular and exacting target acquisition and picking. In such examples, the narrower field of view camera may be able to more accurately pick out targets that are partially obstructed, laying in a difficult-to-see orientation, or be nearby other targets. In such a way, the more precise narrower field of view camera system may be able to discern the target from the non-targets and update the coordinates from the wide field of view camera, with more precise coordinates to pass to a picker head assembly for harvesting.

In such examples, use of the on-arm camera to perform visual servo-ing can serve the purposes of accounting for variations in the harvester orientation due to uneven field conditions, forward progress of the machine down the row and errors introduced in the mechanical tolerances of the encoders and motors of the mechanical arm. This may also allow the use of a more inexpensive robotic arm to help control the cost of the system.

In some examples, the gathering of imagery may be decoupled from harvesting operations if a finer temporal scale is required to observe field conditions. In some examples, a separate, dedicated ground rover may be employed with the sensor package to autonomously or semi-autonomously roam the fields and evaluate conditions.

Stereoscopic Camera Examples

In some example embodiments, additionally or alternatively, the seeker subassembly robotic arms may include at least one camera fixedly mounted as described herein. In some examples, the seeker subassembly robotic arms may include at least one light system as described herein. In some example embodiments, a single robotic arm may include a multitude of cameras and light systems. In some example embodiments, additionally or alternatively, the cameras and/or lights may be integrated into the harvesting robotic arms. For example, referring to FIG. 1A, in some examples, the picker 102 on the end of the robotic arm 160 could include a camera and light system. To help map coordinates of targets in three dimensions, stereoscopic camera arrangements may be used with computer analysis.

In some examples, as described, these stereoscopic cameras may be mounted to the harvesting system. In such examples, by offsetting multiple cameras with generally the same aimpoint or field-of-view, a three-dimensional view of a target may be made from more than one direct-on angle. FIG. 5 shows an example with stereoscopic camera arrangements which may be used to determine coordinates of a target. Such examples may utilize pixelated image data to assign coordinates to targets represented by specific pixels. Such coordinates may be passed to the harvester picker heads for picking.

In the general stereoscopic example of FIG. 5, two digital cameras, a left camera 510 and right camera 520 may be mounted on the systems described herein and utilized to determine three-dimensional coordinates of an identified target 550. For example, dimensions include, an image plane 590 is some f distance 592 from a line 524 between the cameras 510, 520, angles $\Theta$ 512, 522 between the respective optical axes 514, 524 of the respective left camera 510 and right camera 520. Using these dimensions, the image plane 590 coordinates in X and Y may be determined for the target 550 for both the left camera 516 and right camera 526. Using these coordinates 516, 526, the images captured by the cameras 510, 520 may be used to determine a combined three-dimensional coordinate for the target 550 and pass that coordinate to the harvesting system for picking as described herein, in some examples, in a queue with other target coordinates.

In some examples, the stereo techniques include fully calibrated cameras to accurately determine the distance of targets in the images. In some examples, the imagery from the left camera 516 and right camera 526 in a stereoscopic pair is processed using software on a computer processor to extract three-dimensional information from the target scene and target 550. Additionally or alternatively, three-dimensional data processing may occur in a dedicated hardware processor such as a custom Application-Specific Integrated Circuit (ASIC), Field-Programmable Gate Array (FPGA), Graphics Processing Unit (GPU) or Vision or Video Processing Unit (VPU).

In some example embodiments, additionally or alternatively, a cascade of hierarchal cameras may be employed on the systems. In such examples, larger scope or angled cameras may be used to identify one or more targets from a wide angle. In such examples, a first coordinate mapping may be calculated using the wide angle lens cameras. In such systems, the back-end computers may receive the first coordinate or mapped information and use that to focus a second camera system on the selected targets for a more refined or granular targeting. The second set of narrower angle cameras may be configured to hone in on the targets that the wide angle system first mapped, and refine or detail a tighter set of coordinates for each target. This arrangement of passing from wide angle camera systems to a second set of narrower camera systems may allow for a tight control loop for the picker assemblies.

In some examples, one or more laser sensors such as range finders may be configured on the systems to find, locate, and map targets. In some examples, lasers may be employed to augment other camera assemblies. In some examples, lasers may be used exclusively. In some examples, each picker head may include its own laser system to be used as a range finder, a color differentiator, target painter. and/or other sensor for the final picking action at the target itself.

In some example embodiments, additionally or alternatively, the seeker subassembly and/or harvesting subassembly robotic arms may use sensors to identify foliage blocking targets and use the sensor data to maneuver a foliage moving flipper or pneumatic air jets configured to alter, move, displace, and or otherwise gently maneuver the foliage of the plant to better expose the target berries for harvesting.

Automation and Remote Graphical User Interface (GUI) Examples

Additionally or alternatively, the systems described here may be used to harvest agricultural targets in an automated, semi-automated, or even manually controlled manner. In some examples, the semi-automated manner may be arranged in a remote setting, allowing for a human to interact with camera views from the harvester to help target the produce.

The variations on these options depend on how much a remote or local computing system may be programmed to identify and harvest a target. For example, in a fully manually controlled system, a human operator may control the movements of both the seeker system and the harvesting system. In such examples, by remote control using a joystick or other computer driven operating device(s) a human could scan the rows of plants for a target using the camera systems, and even maneuver the robotic arms that the camera systems are connected to, to identify targets, and then use a control system such as a joystick to maneuver the picker head assembly to the target, and then harvest the target as described herein. Such examples would allow for remote operation of the systems such as by wireless control to allow for human controllers to be stationed anywhere in the world, through combination of wired and wireless uplinks.

FIG. 6 shows an example GUI where a human may interact with a touchscreen or other interface to select targets using the computer systems. In some examples, this GUI is presented on a remote system, in communication with the harvester machine. The screen may depict a camera view or image captured by cameras from the harvester, and presents either a still or moving video image in whichever energy spectrum the camera operates in. For example, in a visible camera arrangement, the screen may show what a visible light camera image captured, allowing a human operator to select whichever targets 650 she so chooses from the image data. The software then boxes 687 the target on the screen around the selected target 650. The computer systems on the harvester and the sensors, whichever they may be, then generate a coordinate for that selected target, store and pass that coordinate as a viable target for harvesting to the harvesting subassembly. In some examples, a false color, or color mapped image may be displayed to the remote operator enhance the contrast or visibility of certain features of the target to be picked. This may include features such as, but not limited to bruising, contamination and other undesirable deformities. Categories of targets may be selected by the user in such a way, to indicate which targets are for harvesting, which for removal, and which to pass for later harvesting as underripe.

In some examples, the three-dimensional image data processed by and sent from the camera(s) and/or other sensors may allow for a virtual reality environment to be created for a human user in a remote location. In such examples, a virtual reality headset or display may be utilized by a user, remote or close to the harvester, to locate and identify targets using the camera image data and thereby send the target mapping coordinates to the harvesting machine for harvesting. For example, a user with a virtual reality headset may view camera data from the sensors on the harvesting system, and use a user input device such as a trigger, button, remote, and/or other indicator in conjunction with the virtual reality display to mark and/or otherwise identify targets in the image data. In some examples, remote users may utilize touch screen tablet computers to view still images taken by sensor(s) at the harvesting assembly. Such users may select targets using the touch screen and thereby identify targets to harvest for the system.

In some examples, data created by the cameras and data created by the human selection of agriculture may be stored by the computing device. In such examples, the identification data which in some examples may be labeled by a human operator using an interface, may be amassed and post-processed. In such examples, after much data regarding targeting, identification, and/or harvesting is gathered, a neural network engine may be trained and eventually may be able to replicate some or all of the human targeting using the labeled datasets.

FIG. 7 shows another example GUI where a human may interact with a touchscreen or other interface to select targets using the computer systems. In the example FIG. 7, a static image is displayed 710 captured from the harvester camera sensor systems as described herein. In some examples, the image may be a real-time moving live image. In some examples, multiple, stereoscopic static images are displayed. In some examples, virtual reality images may be displayed for a user to select and classify targets. Any kind of image display may be utilized with the systems and methods described herein for a remote and/or local human operator, live streamed and/or statically captured images.

In the example FIG. 7 shown, the image displays multiple targets 750, 751, 752, 753, 754 around which an indicator shape 760, 761, 762, 763, 764, has been rendered. Such an indicator may be rendered by the computer system, using algorithms and image processing in an attempt to automate the target identification. In fully autonomous mode, the computer system would select all the targets without human intervention. In semi-autonomous mode, the computer system may select targets that it is able to identify, and presents them for editing to a human operator. In a fully manual mode, no targets are identified by a computer, and the human operator must select them all.

In some examples, the human operator, in semi-autonomous, or manual mode, may touch the screen where a target is located, in order to identify the target for mapping and harvesting, causing the computer to display the indicator 760, 761, 762, 763, 764. In some examples, a cursor may be manipulated by a human user using a joystick, mouse, keyboard, touchpad, augmented reality button, virtual reality trigger, or any other kind of human interface that allows selection of a target from the screen. Once selected, the computer may utilize the pixel locations of the target to map coordinates of the selected target to pass and/or queue to the harvesting system for harvesting.

In the example of FIG. 7, more than one kind of indicator 760 may be used by the computer or human operator. For example, the user interface shows different available icons for which a human and/or computer may classify a selected target. In the example, a good target 730 is indicated as one for harvesting. A trash target 732 is one indicated to pick and discard in order to clear the foliage of bad targets. An underripe target 734 may indicate a target that should be left alone, not picked but potentially monitored for later harvesting. The user interface may utilize many varieties of identifying to the user these or other classifications of targets. For example, a color system may be used to indicate good, trash, or underripe targets. In such a system, a good indicator 730 may be blue in color, a trash indicator 732 may be red in color, and an underripe indicator 734 may be yellow in color. Any color may be used in each of these indicators for the human operator to more easily identify which of the classifications each target 750 is. In some examples, alternatively or additionally, dashed lines may be used for the indicators 760, highlighted areas, lowlighted areas, blinking indicators, or any other kind of visual identifier may be used along with or to replace colored indicators.

In some examples, the computer system may keep a tally 740 of the classified or categorized targets on the screen. In some examples, a button to request image review by a human supervisor may be presented 742. In such examples, the image with classified targets may be sent to a supervisor user to run a quality control analysis on the selections in which case, the supervisor may make edits and/or send the image back to the human operator for further editing.

In some examples, the user interface may include a button indicating that the human user is done with the image and target classification 770. By selecting the done button 770, the human may then signal to the computer to send the coordinates of the targets for harvesting to the harvester system. In some examples, after a done selection is made, another image is presented for target selection. Alternatively or additionally, a done and pause button 772 may be presented which would allow the human user to send the current image selection to the computer system for harvesting but then pause the next image presentation for some duration of time. In such examples, the computer may send the next image to another user for target selection, while the other user takes a break or ends a shift. In some examples, the user may be given a time limit to make the target selections and/or to submit target images before the next image is presented. In some examples, a time bar 774 may be shown on the screen which changes color or diminishes in size at a specific rate, indicating to the human user the time before the next target image is presented. Such a time bar 774 may help human users to budget their time and keep on task while the harvesting system is operating in the field. This time discipline may be useful because in real-time harvesting examples, the remote operator may not see the harvester moving down a row to harvest targets, but in another part of the world, the system may be moving and harvesting. Getting behind on selection of targets may hinder the progress of the harvester, and slow production. In some examples, a rate calculation 780 may be presented to indicate how many targets per hour, per minute, per day, or any other rate are being harvested. Such a calculation may be used to aid a supervisor to speed up slow users, allow for rewards to be handed out to the most productive workers, and utilize the data for optimization of techniques and methods of harvesting in the overall remote system.

In some examples, an end session button 776 may allow a human user to stop the selections and end a session of image selection. In some examples, the user interface of FIG. 7 may pre-fetch and cache one or more frames for the human operator to evaluate. As maximum productivity is the desired performance level of the entire human-harvester system, pre-fetching frames can help reduce the wait-times that could potentially be associated with transmitting digital image files from the back-end computing system to a remote operator located anywhere in the world. Pre-fetch queue depth and timing parameters need to be carefully considered to achieve the desired minimum down-time performance of the operator while maximizing the forward velocity a harvester in the field can achieve. This is achieved by preventing harvesting pauses resulting from delays in receiving pick decisions from a remote operator.

The other extreme of control systems would be a fully automated system. In such a system, the traversing machines would move down a row of agricultural targets and the seeker subassembly would use machine learning/artificial intelligence/neural networks/and/or other programming to seek out and identify targets with the seeker subassemblies and then harvest them as described using the picker heads. Such examples would depend on computer algorithms and programs to determine using the inputs from the cameras and sensors, what a target may be and where they are located. For example, a color camera may be used by the computing system to detect a red strawberry amongst the green foliage of the plant it is growing on. Then a laser system and/or stereo camera vision could be used to determine an approximate location and range from the system and the computers could use that information to triangulate a three-dimensional coordinate system and identify where the target is located in space, relative to the traversing machine. Next, the coordinates could be passed to the harvesting subassembly where the picker heads may attach to and harvest the target strawberry, in some examples using its own sensors such as cameras and lasers.

The middle-ground option between the fully automated and the manually controlled system would be some variant of semi-automated seeking and harvesting. The degree of semi-autonomy and which portions were automated and which manually controlled could vary from separate subassemblies. For example, the seeker subassembly may be more manually controlled with a human interacting with the cameras and sensors to help identify targets. In some examples, that may include a human interacting with a graphical user interface "GUI" such as a touchscreen to identify a target displayed on the screen. FIG. 6 shows an example screenshot of what a human interaction screen may look like. By tapping or boxing the target 687, a human could help identify a target for the system to then map the coordinates.

In such a system, the computer system may then determine and use the identified target coordinates to pass to the harvesting subsystem for harvesting the targets. In some examples, machine learning or artificial intelligence may even be used to present potential targets 688 to the human interface screen for the human to either confirm 688 or deny 686 by tapping or selecting. In some examples, the interface screen may then indicate whether the target has been approved or not, in the example with a check mark or X mark. These GUI examples are merely exemplary and not intended to be limiting. Correction data provided by the human to any selection that is inferred by the on-board neural-network can also be utilized as training data to be fed back into the development of the neural network.

In any of the above examples of automation, the sensors onboard the harvesting system may be used to create, track and pass coordinates of the targets for harvesting by the picker assemblies.

In some examples, a precision navigation system such as GPS or LIDAR may be used to keep the planting assembly centered on the planting bed. Additionally, the location of individual plants placed in the ground may be recorded in a global coordinate system for such business intelligence purposes such as tracking inventory.

FIG. 7 shows another example user interface, where a remote operator may be able to help the computing system identify targets for harvesting. In this example, still digitized images, taken by cameras on or near the harvesting assembly are presented on a computer screen. Such example screens may not be near the harvesting system itself, and instead be a remote user station with wireless communications connecting the remote user to the harvesting system. In such a way, the targets may be identified by a remote user, not subjected to the elements, in a location that is easy to maintain. The information may flow through communication channels for the digitized images, as well as the identification of targets as described herein, using networks, switches, routers, and other wired and wireless computerized communication and control systems.

In some examples, the computer, using information programmed into it regarding size, shape, color, temperature, fluorescence, or any other characteristic, may analyze a digital image and identify targets within that image. In some examples, such an image, with previously identified by the computing system targets, may be presented to a user as a still image. As can be seen in FIG. 7, the previously identified targets are highlighted in a color-coded system. Using the image and an interface such as a touch screen, mouse, joystick, voice control, eye control, wearable three-dimensional controller with gyros, or any other kind of controller alone or in combination, an operator may select new targets that were missed by the computer, delete targets selected by the computer because they do not meet the correct criteria for harvesting, or otherwise identify targets for the computer.

In such a way, each time a user either ignores a correctly identified target, adds a new target that was missed, and/or deletes a computer selected target, the computer is able to store and analyze that data for future use. In such a way, the computer is constantly fed new models to train its algorithms on for future target acquisition.

Neural Networks and Training Models for Artificial Intelligence Examples

Systems and methods here may include use of neural networks, machine learning, and/or artificial intelligence programming to help identify targets as described in FIG. 7 and FIG. 9. In such a way, the programming may learn, by being fed examples and/or models of what target color, size, shape, position, or other characteristics are acceptable for harvesting, which to wait and not harvest yet, and which are to be removed as garbage. In some examples, enough model training may be utilized to change from semi-autonomous, where a computer attempts to identify and/or classify targets for human operators to review and edit, to fully autonomous modes, with the computer system utilizing its software to identify, select, and/or classify targets, just as humans would do as shown in FIG. 6 and FIG. 7. This may take time, such as a few harvesting seasons for the neural network and/or artificial intelligence models to be fed by data in actual harvesting settings and environments, but over time, the model updates may allow for the computer to make better decisions as it is trained and retrained with new data. In such a way training data may be fed back into the AI through careful quality control of inputted data. The neural-network may be developed for one variety of strawberry, or may be developed to handle multiple varieties of targets.

In some examples, control of the picker head, once it reaches a predetermined offset distance from the mapped coordinates of the target to be picked, control of the movement of the robotic arm may be handed off to an internal guidance system that may lock onto the targeted berry and fine tune any discrepancies in the logged coordinates that may occur from the forward movement of the harvesting platform. Such an internal guidance system may utilize a neural network inference and/or artificial intelligence in conjunction with accumulated data gathered onto to make decisions and send associated commands to the robotic picker head assemblies. In some examples, the predetermined offset distance is 6 inches from the target. In some examples, the predetermined offset distance is between 3 and 10 inches from the target. In some examples, the predetermined offset distance is between 2 and 15 inches from the target.

The end result in a full automated or mostly automated systems, would be to minimize the number of humans involved over time, with target identification.

Computerized Network Examples

Figure 10:
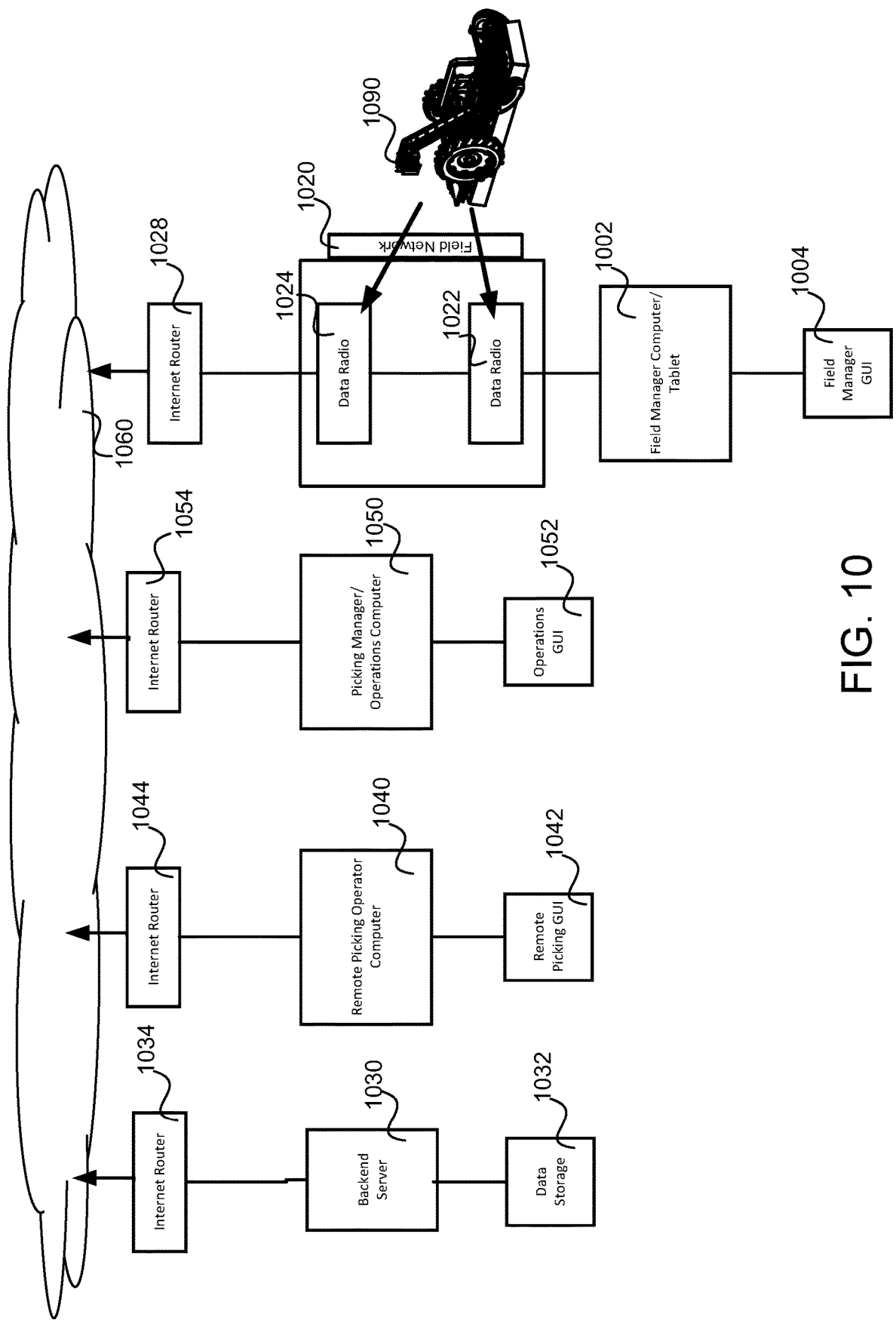
FIG. 10 is an example computer architecture arrangement that may be used in the embodiments disclosed herein.

In some examples, the harvesting systems may be in communication through various wireless and/or wired networks, with computing back-end systems, other harvesters, other sensor suites, as described in FIGS. 8, 9, and 10.

For example, in FIG. 8 an example networked system is shown which could be used in the systems and methods here. In FIG. 8, the computer system(s) 802 onboard the harvesting system which is used to operate the sensing, coordinate generation, and/or harvesting system, including process any images from the various sensors including cameras taking images of the targets and plants. Such image data may include pixel data of the captured target images. The computer(s) 802 could be any number of kinds of computers such as those included in the sensors themselves, in the robotic assemblies, image processing and/or another computer arrangement in communication with the camera computer components may include those examples are described in FIG. 11.

As shown in FIG. 8, the image data captured may be transmitted to a back-end computer system 830 and associated data storage 832 for saving and analysis. In some examples, this may include the remote operators who are interfacing with the harvesting systems, selecting targets, and/or overseeing maintenance of the systems. In some examples, the communication may be a wireless transmission 810 by a radio, cellular or WiFi transmission with associated routers and switches. In some examples, the transmission may be through a wired connection 812. In some examples, a combination of wireless and wired transmissions may be used to stream data between the back-end 830 and the harvesting system including cameras, robotic pickers, etc.

In some examples, the transmission of data may include transmission through a network such as the internet 820 to the remote operators, back-end server computers 830, and associated data storage 832. Once at the back-end server computer servers 830 and associated data storage 832, the pixelated image data may be acted upon by the remote operators to choose targets to harvest. In some examples, the data may be useful to train the neural network, and/or artificial intelligence models as to good targets versus targets to pass up. In such examples, the image and target data may be stored, analyzed, used to train models, or any other kind of image data analysis. In some examples, the storing, analyzing, and/or processing of image data may be accomplished at the computer 802 which is involved in the original image capture. In some examples, the local computer 802 and a back-end computing system 830 may split the data storing, modeling, analyzing, and/or processing. Back-end computer resources 830 may be more powerful, faster, or be able to handle more data than may be otherwise available at the local computers 802 on the harvesting machines. In some examples, the networked computer resources 830 may be spread across many multiple computer resources by a cloud infrastructure. In some examples, the networked computer resources 830 may be virtual machines in a cloud infrastructure.

In some examples, additionally or alternatively, data storage 840 may be utilized by accessing it over the network 820 in a distributed storage method. In some examples as described herein, remote human operators may utilize computer interfaces 890 to make target selections and send mapped coordinates back to the harvesting system 802 for harvesting. In such examples, back-end computer systems 892 and/or server computer systems may work with the user interface screens and selection inputs 890 to send and receive data regarding the images, selections, categories of selections, and/or target coordinates with the harvesting systems 802. In such a way, remote operators may view image data from the sensors on the harvesting system 802, make target selections and classifications, and the computer systems may generate target coordinates to allow for the robotic assemblies to harvest the targets accordingly.

More detailed network examples are found in FIGS. 9 and 10.

Example Computing Device/Architecture

In example systems described herein, various computing components may be utilized to operate the systems. For example, a communication computing system may allow for remote operation of the machines, sensors may send information to a computing system to help differentiate targets from non-targets, target location and mapping information may be calculated, stored, sent, and utilized between the seeker systems and harvesting systems, steering and driving instructions may be calculated and utilized, machine learning/artificial intelligence/and/or neural networks may be employed by computing systems to find and harvest targets, and any of the other computing operations as described herein.

In some examples, alternatively or additionally, a WiFi system/cellular system/Bluetooth system, or any other communication system, with the appropriate antenna system and a processor and memory as described herein, may be used on a subassembly. In some embodiments, alternatively or additionally, the hardware may include a single integrated circuit containing a processor core, memory, and programmable input/output peripherals. In some examples, the hardware may contain one or more specialized processing centers for running the neural network inference processing in an accelerated fashion using devices such as graphics processing units (GPU), vision processing unit (VPU), and field programmable gate arrays (FPGAs).

In some examples, various computing components may be used in the seeker and/or harvesting subassemblies, as well as the communication systems, control systems, and/or any other portion of the systems described herein. In some examples, multiple computing devices may exist on the harvesting platform and perform discrete functions associated with harvesting operations. In such examples, each computing device may be interconnected, or in communication with other computing centers within a networking system such as Ethernet or controller area network (CAN).

FIG. 9 shows an example computer architecture layout which may be utilized by the systems and methods described here, onboard the harvester. The example of FIG. 9 shows one harvesting system with multiple picker arms and sensors. Each computer component in FIG. 9 may represent the software utilized to effectuate the indicated features and/or the computer hardware to include a processor, memory, data storage, and/or virtualized processors, memory, and/or data storage to operate and carry out the instructions for the harvester, similar to, or the same as, that shown in FIG. 11. The system controller 902 may coordinate the subfunctions and be in communication with multiple computer components including but not necessarily limited to a propulsion system 904, and/or a steering system 906 to drive and control the movement of the overall harvesting system. Such a propulsion system 904 may be in communication with motor(s) utilized in locomotion or moving the overall system in the field. The steering 906 system may be in communication with a steering column, movable wheels, tank treads, or other maneuvering actuators utilized in turning the harvester in the field.

The overall or master system controller 902 may be in communication with a navigation system 910 to receive and analyze positional data of the harvester, such as geographical and/or relative positional data within a field, which may include but may not be limited to, a Global Positioning System 912, Inertial Measurement Unit 914 for example a ring laser gyro, a magnetic gyro etc., Simultaneous Localization And Mapping system 916, and/or an Odometer 918. Each of the navigation systems 910 may include all of the antennae, programming, chip sets, and/or other hardware and software necessary to collect data and determine location, speed, distance, direction, or other navigation features necessary for the operation of the harvesting system and transmit that navigation data back to the controller 902.

In some examples, additionally or alternatively, the cameras in the seeker/sensor subassembly and/or other cameras on the harvesting subassembly may be used to identify and track an agricultural row down which the vehicle may be steered. In some examples, LIDAR and/or Radar may be used to navigate the system in the field. The location sensing and/or steering may be fed into any computing system, either located on the harvesting/seeking systems or remotely, in order to autonomously, semi-autonomously and/or allow for human activated remote steering. Any combination of these or other systems may be used to locate and/or steer the systems here.

In some examples, the harvester system may utilize self-steering, that is computerized algorithms to send instructions to the propulsion 904 and steering systems 906, when it is harvesting on a row and human manual drive to steer the system for unloading accumulated berry containers and reloading empty containers, then finally steering the system back onto a new row to be picked. The system may have the ability to be converted to full autonomous mode for turnaround at the head lands as well as unloading and loading berry containers.

The controller 902 may also be in communication with a field network 920. Such a network 920 may be located in the physical field of operation and include one or more data radios 922, 924 which may communicate with the harvester and controller 902 through an optional communication interface 926 which may include all the necessary antennae, data sending and receiving hardware and software necessary for off-board communications. In such examples, data such as image and/or target coordinate data, may be sent from the system 926 to local radios 922, 924, etc. and then off to an internet router 928 to communicate through the internet 960 or other network as described in FIG. 8. By off-loading the data to a local field network 920 then internet 928, remote harvesting target selections may be made using the image and/or coordinate data determined by the harvester, sent to a remote user for target selection/classification, and the coordinate data and harvesting instruction sent back to the harvester for harvesting.

System controller 902 may provide security and isolation to prevent unauthorized users from reaching key internal systems. Such segmentation of communications may include encryption of data sent and received from the harvester including image data sent and received with a back-end system such as described in FIG. 8.

FIG. 9 also shows the system controller 902 in communication with a network switch 930. Such a switch may be in communication with one or more picking segments 940, 950 and their associated own network switches 942, 952 respectively. Although the example in FIG. 9 shows two picking segments 940, 950, any number could be located on a harvester system and controlled by the controller 902. FIG. 9 shows just two picking segments as an example, not intended to be limiting, and more picking segments such as but not limited to one, two, three, four, five, six, seven or eight picking segments. Reference will be made to the two example picking segments and the similar or identical component parts found in each, but are not intended to be limited to just two, and could be any number as indicated here.

Each picking segment 940, 950, etc. may include many multiple component parts including a network switch 942, 952 for communication with the system controller 902 by way of the main network switch 930. Such a network aggregation device 930, such as an ethernet switch, can interface all harvester segments to the central system controller on the platform. This can alternatively be achieved through multiple communications internal to the system controller 902.

Each picking segment 940, 950, etc. may also include a target acquisition or an identification processor 944, 954 and/or a motion processor 947, 957 in communication with the respective network switches 942, 952. The identification processor 944, 954 may include artificial intelligence subcomponents and/or neural network programming used to make determinations of target selection and/or coordinate mapping of targets using the image data from the cameras as described below. Each identification processor 944, 954 may also be in communication with an identification camera 945, 955 or two cameras 946, 956. Such cameras 945, 955, 946, 956 may provide the pixelated image data taken of the targets in order to process for target selection, target coordination, and/or classification of targets as described herein, in some cases by remote operator selection.

In systems using multiple cameras, such cameras may be arranged in a stereoscopic manner to generate three-dimensional coordinate data of targets in the field as described in FIGS. 5 and 4. The number of cameras for each picking segment is not limited to two, and could include wide angle/narrow focus cameras, stereoscopic cameras, thermosensitive cameras, laser rangefinders, and/or any other kind of sensors that work alone or in combination. In such a way, the processing center 944, 954, may assign a three-dimension coordinate in a world system to each pixel gathered by each of the cameras 945, 955, 946, 956. Such a processing center may perform neural network processing to identify all candidate harvest targets in the acquired imagery and transmit all processed results to the system controller 902. Additionally or alternatively, the results may be directly transferred to the motion processor 947, 957 described below, for fully or semi-fully autonomous examples of the system.

In some examples, another processor, a motion processor 947, 957 may also be in communication with the network switches 942, 952 and also optionally be equipped with artificial intelligence programming in order to help determine relative motion and positioning of the harvester, cameras, picker assemblies, and/or image data used for target analysis. Such motion processors 947, 957 may be able to determine coordinate systems of the targets based on the images taken by the cameras 945, 955, 946, 956, the position of the overall system with data from the navigation system 910 and instruct the robotic arms 948, 958 toward a target for harvesting. In some examples, a servo camera 949, 959 may be utilized to focus on a target even if the system on which the camera is mounted is moving relative to the target. In such examples, motors in the servo camera 949 may utilize feedback of a selected target to lock onto the target and move to keep the target in a field of view. In some examples, the robotic arm 948, 958 may be instructed toward a target for picking, based on the coordinates created by the system and target selected by a human and/or computer system. The motion processing center 947, 957 can receive targets to harvest from the system controller 902 or identification processor 944, 954, in fully autonomous examples. The motion processor 947, 957 may use vehicle position information from the system controller 902 to resolve the relative position of the target to be picked and computes a path for the robotic arm 948, 958 to reach the target. Such coordinates may be updated based on navigation system 910 updates and/or servo camera 949, 959 target acquisition updates. In such a way, after a commanding motion, continuous feedback from the servo camera may monitor the progress of the motion of the arm 948, 958 towards the picking target and real-time neural network processing identifies and tracks the harvest target. The system may then harvest a target with the robotic arm(s) 948, 958 and then move to the next queued target image coordinate data to harvest the next target.

In some examples, neural network processing can be accelerated in the motion processor 947, 957 through the use of dedicated hardware such as graphics processing units, video processing units, and/or field-programmable gate arrays. Results from the real-time neural network processing can be used by the motion processor 947, 957 to correct the target path of the robotic arm 948, 958 motion to compensate for variable conditions such as (but not limited to) forward motion, changing vehicle attitude, inaccuracies in the robotic arm, and physical disturbances. Servo camera 949, 959 imagery can also be utilized to avoid obstacles in the path of the robotic arm 948, 958 motion such as leaves, rocks, dirt and other potential harvesting targets. Upon reaching the harvesting target, the motion processor 947, 957 may command the actuation of the gripper on the robotic arm 948, 958 to acquire the target and deposit the target for harvesting.

FIG. 10 shows a computer architecture diagram of the various computer and/or software components that may be in communication with one another to be used in the systems and methods described herein responsible for orchestrating harvesting operations. FIG. 10 is a computer architecture diagram expounding on an aspect of that shown in FIG. 9. As in FIG. 9, FIG. 10 shows a back-end architecture with a back-end server 1030 and associated data storage 1032 communicate through an internet router 1034 and through a network 1060 such as the Internet and/or a virtual private network with other components as described herein.

In some examples, images or other sensor data taken from the harvesters 1090 in the field may be communicated through the field network 1020 and data radios 1022, 1024 and an internet router 1028 and through the network 1060 to the back-end server 1030 to be analyzed. Such analysis may include actively assigns frames to be evaluated to a pool of remote users 1040 and thereby their user interface 1042 through the network 1060 and router 1044. In such examples, these remote users may be tasked with indicating or labeling the provided image data with a human-evaluation of the correct harvest-targets in the image data as described in FIG. 6 and FIG. 7 above.

The backend system 1030 may route coordinates for harvest targets from remote users 1040 to the appropriate harvester 1090 in the field when the remote user evaluation has been completed. The backend scheduling system may include algorithms to maximize the productivity of harvesting operations as a whole to keep harvesters serviced and remote operators fully engaged with imagery to be labeled. The backend system 1030 may or may not store 1032 acquired imagery and operational data for further analysis to improve situational knowledge of harvester operations regarding business efficiency. The backend system 1030 may employ the use of a database 1032 to organize, store and retrieve results during and after harvesting operations.

The computing architecture can include remote interface computer(s) 1040 for remote human operators to interact with harvesting operations. In some examples, the remote interface computer contains a graphical user interface (GUI) 1042 that presents a human operator with imagery of areas of harvest acquired by the in-field system 1090 or seeker. The remote operator GUI 1042 may provide tools that allows a human to identify and classify potential harvest targets in the scene such as described in FIG. 6 and FIG. 7. The GUI 1042 may provide classifications to identify the target as under-ripe, ripe, over-ripe, diseased or damaged. The GUI 1042 can be optimized to provide classifications to meet the needs of the particular crop being harvested. The presented imagery may additionally display preliminary classification results inferred by the on-harvester neural network to speed up human identification efforts as described in FIG. 6 and FIG. 7. The remote operator GUI 1042 can take user input from an operator using input devices such as keyboards, mice, touch screens, eye-tracking, joysticks, or custom-developed human interface devices. Classification changes that the human operators perform can additionally be recorded by the backend computer system 1030 and utilized as training information to refine the performance of the harvester on-board neural networks.

The computing architecture can include a Picking Manager/Operations Manager (PM-OM) 1050 computer for the purposes of managing day-to-day and seasonal harvesting operations related to the harvesting system, in communication through an internet router 1054 with the network 1060 and thereby the other components. The PM-OM computer 1050 may provide a GUI 1052 with selectable controls to allow management of the system by a human operator. Actions performed by the GUI 1052 may include functionality such as user administration, harvester administration, maintenance tracking, harvesting performance report generation, product analysis, product tracking along with other information and controls related to harvesting operations, and/or any other administrative function alone or in combination.

The computing architecture can include a Field Manager Computer 1002 to provide in-field human resources access to information and controls necessary for harvester 1090 operations. In some examples, a semi-autonomous operation of the harvesting platform 1090, humans may be required to actively maintain the system to perform functionality necessary for operations. These operations can include fuel resupply, consumable packaging material loading, finished product offloading, cleaning, end of row alignment and maintenance. Further developments to the platform can be made to minimize the need for in-field operators 1002 to include operations such as self-loading/unloading, auto-field navigation/driving and intelligent cleaning systems. The Field Manager computer 1002 may utilize a GUI 1004 to provide information and controls to an operator for local control of the system. Information presented may include system health status, present location, performance metrics, error conditions, diagnostics and/or fuel level or any other logistical information and control. Controls 1004 presented to an operator can include system enable, system stop, diagnostic controls, exterior lighting, emergency stop and/or manual driving modes or any other form of navigation or other commands. The field manager computer 1002 may interface to a harvester 1090 through a wireless connection provided by the in-field network 1020. Additionally or alternatively, the field manager computer 1002 may contain a direct communications link to the harvester 1090 using interconnection technologies such as USB, Ethernet, serial, fiber, CAN, Bluetooth, NFC and/or private WiFi interfaces or any combination of these or other communication methods.

Figure 11:
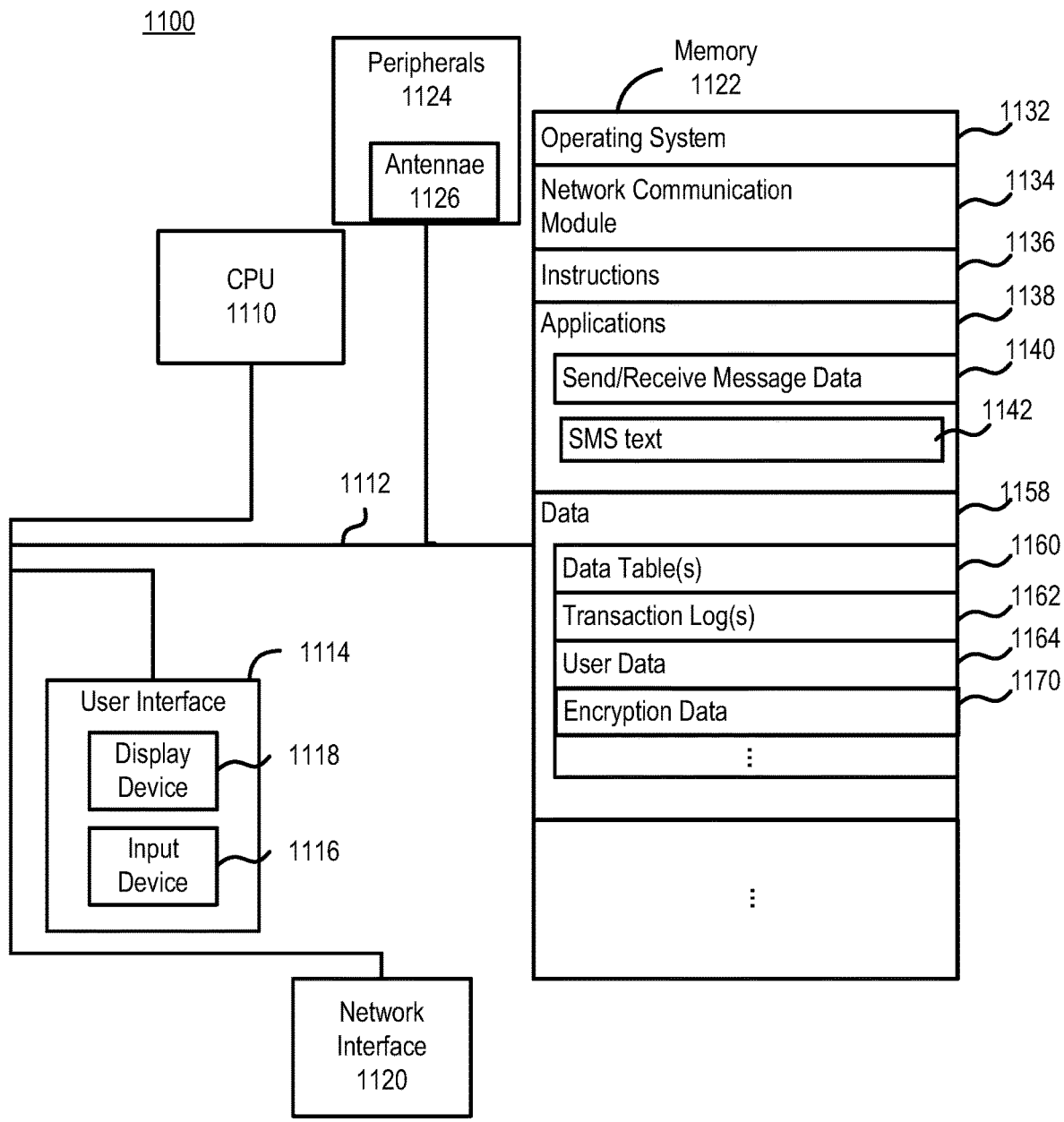
FIG. 11 is an example computing system which may be used in the embodiments disclosed herein.

FIG. 11 shows an example computing device 1100 that may be used in practicing example embodiments described herein. Such computing device 1100 may be the back-end server systems use to interface with the network, receive and analyzed data, as well as generate test result GUIs. Such computer 1100 may be a mobile device used to create and send data, as well as receive and cause display of GUIs representing data. In FIG. 11, the computing device could be a smartphone, a laptop, tablet computer, server computer, or any other kind of computing device. The example shows a processor CPU 1110 which could be any number of processors in communication via a bus 1112 or other communication with a user interface 1114. The user interface 1114 could include any number of display devices 1118 such as a screen. The user interface also includes an input such as a touch-screen, keyboard, mouse, pointer, buttons, joystick or other input devices. Also included is a network interface 1120 which may be used to interface with any wireless or wired network in order to transmit and receive data. Such an interface may allow for a smartphone, for example, to interface a cellular network and/or WiFi network and thereby the Internet. The example computing device 1100 also shows peripherals 1124 which could include any number of other additional features such as but not limited to cameras, sensors 1125, and/or antennae 1126 for communicating wirelessly such as over cellular, WiFi, NFC, Bluetooth, infrared, or any combination of these or other wireless communications. The computing device 1100 also includes a memory 1122 which includes any number of operations executable by the processor 1110. The memory in FIG. 11 shows an operating system 1132, network communication module 1134, instructions for other tasks 1138 and applications 1138 such as send/receive message data 1140 and/or SMS text message applications 1142. Also included in the example is for data storage 1158. Such data storage may include data tables 1160, transaction logs 1162, user data 1164 and/or encryption data 1170. The computing device 1100 also include one or more graphical processing units (GPUs) for the purposes of accelerating in hardware computationally intensive tasks such as execution and or evaluation of the neural network engine and enhanced image exploitation algorithms operating on the multi-modal imagery collected. The computing device 1100 may also include one or more reconfigurable hardware elements such as a field programmable gate array (FPGA) for the purposes of hardware acceleration of computationally intensive tasks.

The computing architecture for the harvester can be described as a distributed computing system comprising of elements or processing centers that exist on the harvester, a central server system which may or may not be a cloud-based resource and an operator processing system. Each of these processing centers are interconnected through an IP network which may include local private wireless networks, private wide area networks and/or public networks such as the Internet. Computational tasks are divided such that real-time tasks are executed on the local harvester processor, post-processing operations and non-real time computation are executed on the central server and user-interface computation are performed on the operator processing center.

Lighting Examples

In some example embodiments, the seeker subassembly includes various specialized lighting features which may be used to find and identify targets. Such lights may be configured on the ends of robotic arms, integrated into robotic arms that include picker heads, mounted on the harvester assembly or sub-assemblies, and/or mounted on cameras. Examples are shown in FIGS. 1A and 1B. Such lights may be fixed onto other sub-assemblies on the seeker assembly and/or harvesting sub-assembly and be in communication with a computer system to turn on, change intensity, change light source, switch wavelengths, etc.

In some examples, such specialized lighting may be configured to emit a certain wavelength or spectrum of wavelengths such as but not limited to visible light, infra-red light, and/or ultra-violet light. In some examples, the lighting may be at a wavelength that excites items to fluoresce. In some example embodiments, light spectrum filters may be used by the cameras described herein to filter out or delete wave lengths of light that would otherwise block out any fluorescent properties reflected or emitted by targets such as berries.

In some examples, the specialized lighting may be comprised of light emitting diodes (LEDs) which are tuned to emit light at a specific frequency. In some examples, that frequency may be a combination of 400-500 nm (blue) and 600-700 nm (red). In some examples, the lights may be LED lights. In some examples, the lights may be incandescent lights. In some examples, the lights may be halogen lights, fluorescent lights, metal-halide, neon, high-intensity discharge lamps, or any permutation or combination of any of the above.

Conclusion

As disclosed herein, features consistent with the present inventions may be implemented by computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as 1PROM), embedded microprocessors, Graphics Processing Units (GPUs), firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks by one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Etc.

What is claimed is:

1. A harvesting vehicle system comprising:
    a harvesting vehicle frame with computing device includes at least one processor and a memory including picking control systems, navigation control systems, and communication control systems, a picking subcomponent including a robotic arm in communication with the computing device;
    wherein the robotic arm including a picker head assembly to harvest targets including a vacuum assembly with a compressor, hose, and padded spoons configured to remove targets from target stems;
    wherein the vehicle includes multiple two-tiered stereoscopic cameras in a wide field of view and narrow field of view configuration, in communication with the computing device, wherein the wide field of view cameras are configured to capture and send image data of a target to the computing device;
    the computing device further configured to create three-dimensional maps of the target using the multiple wide field of view camera image data;
    wherein the computing device further configured to use the image data of the target and three-dimensional maps of the target to a capture narrow field of view image data of the target;
    the computing device further configured to direct the robotic arm and picker head to a selected target to harvest using the narrow field of view image data and three-dimensional maps of targets, the picker head assembly configured to attach the vacuum assembly and padded spoons to the selected target, and retract the selected target for harvesting.

2. The system of claim 1 wherein the computing device is configured to send the image data to a back-end computing system over a network and receive target selection using the image data from the back-end computing system.

3. The system of claim 2 wherein the received target selection regarding the image data from the back-end computing system, includes a selection of a category of each selected target.

4. The system of claim 3 wherein the categories of each selected target include grade, spoiled, immature, and ready to pick.

5. The system of claim 2 wherein the selected targets are selected by the back-end computing system, using imbedded neuro network logic, trained from models of human selected targets classified as ready-to-pick, immature, or spoiled.

6. The system of claim 1 wherein the computing device is further configured to utilize close in sensors to direct the picker head to a selected target once the picker head is within a predetermined distance from the target using the three-dimensional map.

7. The system of claim 1 wherein the communication system includes wireless communication devices in communication with the computing device navigation control system, the wireless communication devices configured to send and receive data regarding navigation to wireless antenna in communication with a back-end computing system.

8. The system of claim 7 wherein the navigation control systems includes at least one of Global Positioning System, Inertial Measurement systems, Simultaneous Localization And Mapping systems, and an Odometer.

9. The system of claim 3 wherein the back-end computing system is further configured to cause display of an interface for a user including the image data to allow touch screen selection of targets to be sent to the harvesting vehicle computing device for picking by the picker head.

10. The system of claim 1 wherein the coordinates of the selected target are sent to a queue buffer at the harvesting vehicle computing device for picking by the picker head in queue order.

11. The system of claim 9 wherein the display of the camera image data includes preselected targets, preselected by the back-end computing system, based on training of models of targets, wherein the display interface allows users to affirm or change the preselected targets for harvesting.

12. A method of harvesting agriculture, comprising:
    traversing a harvesting vehicle frame across a row of agricultural plants wherein the harvesting vehicle includes a computing device with a processor and a memory, wherein the computing device including target acquisition control, picking control, wherein the harvesting vehicle including a picking subcomponent with a robotic arm with a picker head assembly, wherein the robotic arm in communication with the computing device, the picker head assembly including a vacuum assembly with a compressor, hose, and padded spoons;

capturing and sending wide field of view image data to the target acquisition control of the computing device, using multiple wide field of view cameras on the harvesting vehicle;

identifying targets in the agricultural plants, by the target acquisition control of the computing device, using the wide field of view image data;

creating three-dimensional maps of targets, by the computing device using the wide field of view image data;

determining coordinates of the targets from the three-dimensional maps;

generating a queue of determined coordinates of targets;

sending the queue of determined coordinates of targets to narrow field of view cameras;

capturing and sending narrow field of view image data to the picking control of the computing device, using the narrow field of view cameras on the harvesting vehicle;

directing, by the picker control of the computing device, the robotic arm and picker head to a first selected target coordinate in the queue of determined coordinates using the narrow field of view image data and three-dimensional maps of targets; and harvesting, by the picker control of the computing device, the first target with the picker head assembly by attaching the vacuum assembly and padded spoons to the mapped target, and retracting the first target.

13. The method of claim 12 wherein the traversing and navigation of the harvesting machine is controlled by navigation control in the computing device.

14. The method of claim 12 further comprising sending and receiving target acquisition and navigation data from a communication control in the computing device with an off-board system.

15. The method of claim 14 wherein the communication control includes communicating using wireless communication devices by sending and receiving data regarding navigation and camera image data by wireless antenna in communication with a back-end computing system.

16. The method of claim 12 wherein harvesting with the picker head assembly includes sending commands to a picker head actuator to pinch padded spoons together to secure a target, the target being identified by the computing device target acquisition control.

17. The method of claim 12 wherein harvesting includes receiving data at the computing device target acquisition control, from close in sensors on the harvesting machine;

directing the picker head to an identified target, by the computing device target acquisition control once the picker head is within a predetermined distance from the target, determined using the three-dimensional maps.

18. The method of claim 14 wherein the target acquisition data from the off-board system includes target selection with selection of a category of each selected target.

19. The method of claim 18 further comprising, causing display, with the off-board system, of a display interface of the camera image data for a user, and allowing touch screen selection of targets to be sent to the harvesting vehicle computing device for picking by the picker head.

* * * * *